(12) United States Patent
Davidson et al.

(10) Patent No.: US 7,546,520 B2
(45) Date of Patent: *Jun. 9, 2009

(54) ELECTRONIC SHIPMENT PLANNER

(75) Inventors: Robert A. Davidson, Fort Smith, AR (US); Corey Goux, Fort Smith, AR (US); Michael Newcity, Fort Smith, AR (US)

(73) Assignee: ABF Freight Systems, Inc., Fort Smith, AR (US)

( * ) Notice: Subject to any disclaimer, the term of this patent is extended or adjusted under 35 U.S.C. 154(b) by 594 days.

This patent is subject to a terminal disclaimer.

(21) Appl. No.: 11/208,193

(22) Filed: Aug. 19, 2005

(65) Prior Publication Data

US 2005/0278657 A1 Dec. 15, 2005

Related U.S. Application Data

(63) Continuation of application No. 09/691,980, filed on Oct. 19, 2000, now Pat. No. 7,003,720.

(60) Provisional application No. 60/174,887, filed on Jan. 7, 2000.

(51) Int. Cl.
*G06F 17/00* (2006.01)
(52) U.S. Cl. ...................................... 715/200; 715/255
(58) Field of Classification Search ................ 715/200, 715/255; 705/13, 34
See application file for complete search history.

(56) References Cited

U.S. PATENT DOCUMENTS

| | | | |
|---|---|---|---|
| 5,910,896 A | 6/1999 | Hahn-Carlson | |
| 5,960,408 A | 9/1999 | Martin et al. | |
| 6,029,140 A | 2/2000 | Martin et al. | |
| 6,034,686 A | 3/2000 | Lamb et al. | |
| 6,108,640 A | 8/2000 | Slotznick | |
| 6,217,076 B1 | 4/2001 | Howard et al. | |
| 6,219,653 B1 | 4/2001 | O'Neill et al. | |

(Continued)

FOREIGN PATENT DOCUMENTS

EP 0683466 11/1995

(Continued)

OTHER PUBLICATIONS

LIn, The Freight Routing Problem of Time-Definite Freight Delivery Common Carriers, Transportation Research 2001, Google, pp. 525-547.*

(Continued)

*Primary Examiner*—Cong-Lac Huynh
(74) *Attorney, Agent, or Firm*—Schwartz Law Firm, P.C.

(57) ABSTRACT

An electronic shipment planner is adapted for electronically presenting shipment and scheduling information to a user. The shipment and scheduling information includes at least one shipment event date. The shipment planner is linked to a shipment data repository containing shipment and scheduling information. A system interface communicates with the shipment data repository. An interactive shipment data link is electronically associated with the shipment and scheduling information, and cooperates with the system interface as commanded by the user to access and retrieve the associated shipment and scheduling information contained in the shipment data repository. A calendar display interface displays the shipment planner to the user in a calendar format, such that the interactive shipment data link is provided on the shipment event date associated with the shipment and scheduling information.

20 Claims, 18 Drawing Sheets

U.S. PATENT DOCUMENTS

| | | | |
|---|---|---|---|
| 6,292,784 B1 | 9/2001 | Martin et al. | |
| 6,345,260 B1 | 2/2002 | Cummings et al. | |
| 6,493,685 B1* | 12/2002 | Ensel et al. | 705/40 |
| 6,675,356 B1 | 1/2004 | Adler et al. | |
| 7,058,596 B1* | 6/2006 | Wojcik et al. | 705/26 |
| 7,206,768 B1* | 4/2007 | deGroeve et al. | 705/54 |
| 7,430,517 B1* | 9/2008 | Barton | 705/7 |
| 2001/0047332 A1* | 11/2001 | Gonen-Friedman et al. | 705/40 |
| 2002/0019759 A1* | 2/2002 | Arunapuram et al. | 705/7 |
| 2002/0022983 A1* | 2/2002 | Barton | 705/7 |
| 2002/0055886 A1* | 5/2002 | Hinckley | 705/26 |
| 2003/0074285 A1* | 4/2003 | Hoffman et al. | 705/30 |
| 2003/0212610 A1* | 11/2003 | Duffy et al. | 705/26 |
| 2004/0098403 A1* | 5/2004 | Gupta et al. | 707/102 |
| 2004/0116116 A1* | 6/2004 | Nadan | 455/432.1 |
| 2004/0167837 A1* | 8/2004 | Reel et al. | 705/34 |
| 2005/0197892 A1* | 9/2005 | Bilibin et al. | 705/13 |
| 2006/0053027 A1* | 3/2006 | Riggs et al. | 705/1 |
| 2007/0299686 A1* | 12/2007 | Hu et al. | 705/1 |
| 2008/0040144 A1* | 2/2008 | Riggs et al. | 705/1 |
| 2008/0183526 A1* | 7/2008 | Hancock et al. | 705/7 |

FOREIGN PATENT DOCUMENTS

| | | |
|---|---|---|
| WO | WO 98/24036 | 6/1998 |
| WO | WO 99/38079 | 7/1999 |

OTHER PUBLICATIONS

Lancioni et al., The Role of the Internet in Supply Chain Management, Google 2000, pp. 45-56.*

Spekman et al., Towards More Effective Sourcing and Supplier Management, Google 1999, pp. 103-116.*

* cited by examiner

40

| FREIGHT SELECTION | REPORT FORMAT | SORT & SUBTOTAL |

Report Wizard  [Next >] [Clear] [Save] [Cancel]

Create Report Like: ALL SHIPMENTS   [Help?]

■ Include shipments with these status and payment selections...

[Any Delivery Status ▼] And [Any Payment Status ▼] And bill is paid by [Any Party ▼]

■ Limit my report by date when the shipments...

[were picked up ▼]  Limit By: [(select one) ▼]  # of Days: [ ]
From: [2000▼], [Aug▼] [9 Wed▼] 📅  Thru: [2000▼], [Aug▼] [9 Wed▼] 📅

■ The report should also include...

| ⊙ all inbound | ⊙ all outbound | ⊙ all third party |
| ○ no inbound | ○ no outbound | ○ no third party |
| ○ select inbound from my vendors' | ○ select outbound to my customers | ○ select third party to the |
| ☐ origin state, or | ☐ destination state, or | ☐ paying location |
| ☐ origin zip | ☐ destination zip | and from the |
| and to my | and from my | ☐ origin state, or |
| ☐ location, or | ☐ location, or | ☐ origin zip, or |
| ☐ state, or | ☐ state, or | ☐ origin station |
| ☐ zip, or | ☐ zip, or | and to the |
| ☐ serving station | ☐ serving station | ☐ destination state, or |
|  |  | ☐ destination zip, or |
|  |  | ☐ destination station |

Fig. 8

Monday, 7-31-2000 2:39 PM | Full Screen | Add Event | Options

Title of Event: Lunch

Description of Event: Lunch with John at the Garden on 10th Street.

Day of Event: August 2, 2000

Starting Time: 12:00 PM

Ending Time: 1:00 PM

Save & Apply Event | Clear | Cancel | Delete

Monday, 7-31-2000   2:35   PM   Full Screen   Add Event   Options

Display shipments based on this report: [ ALL SHIPMENTS ▼ ]

Note: To create a new report,
check out the Reports page.

[ ALL SHIPMENTS, PICKED UP LAST 14
DAYS, STANDARD FORMAT, PRO # ]

Check to include: ☑ Inbound  ☑ Outbound  ☑ Third Party

Post on this date: [ Due or Delivery ▼ ]  [ Due or Delivery ▼ ]  [ Due or Delivery ▼ ]

Reference by: [ Purchase Order # ▼ ]  [ Bill of Lading # ▼ ]  [ ABF Pro # ▼ ]

Default display by: ○ Month  ⊙ Week  ○ Day

☐ Display planner only (remove header and footer).
☐ Expand planner to screen size (based on your monitor).

Start display with: ⊙ Current date  ○ First active shipment date

Week display: ○ Horizontal days  ⊙ Vertical days

Save & Apply Options   Cancel

ELECTRONIC SHIPMENT PLANNER

TECHNICAL FIELD AND BACKGROUND OF THE INVENTION

This invention relates to an interactive electronic shipment planner. The invention is a computer based application that enables efficient management and tracking of shipments using a convenient and easy to read calendar interface. The invention can be accessed globally via the Internet at anytime using standard computer hardware, software, and communications equipment. The invention is further applicable for personal events scheduling. Moreover, the calendar display format of the shipment planner can be readily customized to suit the needs of the user. Unlike traditional planners, the present invention effects electronic filtering of information contained in a data repository to display only a select portion of the information to the user.

SUMMARY OF THE INVENTION

Therefore, it is an object of the invention to provide an electronic shipment planner which provides ready and convenient management and tracking of shipments.

It is another object of the invention to provide an electronic shipment planner which provides shipment data in an easy to read, interactive calendar format.

It is another object of the invention to provide an electronic shipment planner which can be accessed globally via the Internet.

It is another object of the invention to provide an electronic shipment planner which utilizes standard compute hardware, software, and communications equipment.

It is another object of the invention to provide an electronic shipment planner which is applicable for personal events scheduling.

It is another object of the invention to provide an electronic shipment planner which electronically filters information contained in a data repository using customized electronic user reports to display only a select portion of the information to the user.

It is another object of the invention to provide an electronic shipment planner which promotes time and cost efficiency in the shipment industry.

These and other objects of the present invention are achieved in the preferred embodiments disclosed below by providing an electronic shipment planner adapted for electronically presenting shipment and scheduling information to a user. The shipment and scheduling information includes at least one shipment event date. The shipment planner is linked to a shipment data repository containing shipment and scheduling information. A system interface communicates with the shipment data repository. An interactive shipment data link is electronically associated with the shipment and scheduling information, and cooperates with the system interface as commanded by the user to access and retrieve the associated shipment and scheduling information contained in the shipment data repository. A calendar display interface displays the shipment planner to the user in a calendar format, such that the interactive shipment data link is provided on the shipment event date associated with the shipment and scheduling information.

According to another preferred embodiment of the invention, shipment data input means communicates with the shipment data repository for loading shipment and scheduling information into the shipment data repository.

According to yet another preferred embodiment of the invention, the system interface is a Web browser, such as "Netscape Navigator" or "Microsoft Explorer".

According to yet another preferred embodiment of the invention, the shipment data link is a predetermined portion of the shipment and scheduling information.

According to yet another preferred embodiment of the invention, the shipment data link is a shipment reference code.

According to yet another preferred embodiment of the invention, the shipment reference code is selected from the group consisting of a bill of lading number and a purchase order number.

According to yet another preferred embodiment of the invention, a plurality of interactive shipment data links are electronically associated with at least one of an inbound shipment, an outbound shipment, and a third party shipment.

According to yet another preferred embodiment of the invention, the plurality of interactive shipment data links are color-coded to readily distinguish between inbound, outbound, and third party shipments.

According to yet another preferred embodiment of the invention, a legend is provided for indicating the color-code for each inbound shipment, outbound shipment, and third party shipment.

According to yet another preferred embodiment of the invention, a display options data repository contains format parameters for customizing the format of the calendar display interface.

According to yet another preferred embodiment of the invention, a display options data interface communicates with the display options data repository for setting desired format parameters contained in the display options data repository.

According to yet another preferred embodiment of the invention, an input device selects the interactive shipment data link from the calendar display interface.

According to yet another preferred embodiment of the invention, the input device is a computer mouse.

According to yet another preferred embodiment of the invention, a report data repository contains profile parameters for displaying the shipment and scheduling information in a customized user report.

According to yet another preferred embodiment of the invention, a report data interface communicating with the report data repository for setting desired profile parameters contained in the report data repository.

According to yet another preferred embodiment of the invention, a personal event data repository contains personal event information of the user. The personal event information is associated with a personal event date.

According to yet another preferred embodiment of the invention, a personal event data interface communicates with the personal event data repository for loading personal event information into the personal event data repository.

According to yet another preferred embodiment of the invention, an interactive personal event data link is electronically associated with the personal event information, and cooperates with the system interface as commanded by the user to access and retrieve the associated personal event information contained in the personal event data repository.

According to yet another preferred embodiment of the invention, the personal event data link is a predetermined portion of the personal event information According to yet another preferred embodiment of the invention, the personal event data link is a title of the personal event information.

In another embodiment, the invention is an electronic shipment planner adapted for electronically presenting shipment and scheduling information to a user. The shipment and scheduling information includes at least one shipment event date. The shipment planner is linked to a shipment data repository containing shipment and scheduling information. A system interface communicates with the shipment data repository. An interactive shipment data link is electronically associated with the shipment and scheduling information, and cooperates with the system interface as commanded by the user to access and retrieve the associated shipment and scheduling information contained in the shipment data repository. A personal event data repository contains personal event information of the user. The personal event information is associated with a personal event date. An interactive personal event data link is electronically associated with the personal event information of the user, and cooperates with the system interface as commanded by the user to access and retrieve the associated personal event information contained in the personal event data repository. A calendar display interface displays the shipment planner to the user in a calendar format, such that the interactive shipment data link and the interactive personal event data link are provided on their respective shipment and personal event dates associated with the shipment and scheduling information and the personal events information. The shipment data link and the personal event data link are color-coded to readily distinguish between the associated shipment and scheduling information and the personal events information. A legend indicates the color-code for each of the shipment data and personal event data links.

In yet another embodiment, the invention is a method for electronically presenting shipment and scheduling information to a user. The shipment and scheduling information includes at least one shipment event date. The method includes the step of creating a shipment data repository containing shipment and scheduling information. A system interface is then provided to communicate with the shipment data repository. An interactive shipment data link is then electronically associated with the shipment and scheduling information. The shipment data link cooperates with the system interface as commanded by the user to access and retrieve the associated shipment and scheduling information contained in the shipment data repository. The shipment planner is then displayed to the user in a calendar format, such that the interactive shipment data link is provided on the shipment event date associated with the shipment and scheduling information.

According to another preferred embodiment of the invention, the method includes the step of providing a plurality of interactive shipment data links associated with at least one of an inbound shipment, an outbound shipment, and a third party shipment.

According to yet another preferred embodiment of the invention, the method includes the step of color-coding the plurality of interactive shipment data links to readily distinguish between inbound, outbound, and third party shipments.

According to yet another preferred embodiment of the invention, the method includes the step of providing a legend for indicating the color-code for each inbound shipment, outbound shipment, and third party shipment.

According to yet another preferred embodiment of the invention, the method includes the step of creating a personal event data repository containing personal event information of the user, the personal event information being associated with a personal event date.

According to yet another preferred embodiment of the invention, the method includes the step of electronically associating an interactive personal event data link with the personal event information of the user. The personal event data link cooperates with the system interface as commanded by the user to access and retrieve the associated personal event information contained in the personal event data repository.

In yet another embodiment, the invention is a computer readable memory medium, encoded with data representing a computer program, that can be used by a computer system to direct the computer system to execute a method for electronically presenting shipment and scheduling information to a user. The shipment and scheduling information includes at least one shipment event date. The medium includes a system interface communicating with a shipment data repository containing shipment and scheduling information. An interactive shipment data link is electronically associated with the shipment and scheduling information, and cooperates with the system interface as commanded by the user to access and retrieve the associated shipment and scheduling information contained in the shipment data repository. A calendar display interface displays a calendar format, such that the interactive shipment data link is provided on the shipment event date associated with the shipment and scheduling information.

According to another preferred embodiment of the invention, the memory medium includes a plurality of interactive shipment data links associated with at least one of an inbound shipment, an outbound shipment, and a third party shipment.

According to yet another preferred embodiment of the invention, the memory medium includes a display options data interface communicating with a display options data repository for selecting desired profile parameters contained in the display options data repository.

According to yet another preferred embodiment of the invention, the memory medium includes a report data interface communicating with a report data repository for selecting desired profile parameters contained in the report data repository.

According to another preferred embodiment of the invention, the memory medium includes an interactive personal event data link which is electronically associated with personal event information of the user, and which cooperates with the system interface as commanded by the user to access and retrieve the associated personal event information contained in a personal event data repository.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 8 is a screen shot of the user report data interface for creating customized shipment reports based on parameters selected by the user;

FIG. 13 is a screen shot of the user events interface;

FIG. 19 is a screen shot of the planner options interface.

DESCRIPTION OF THE PREFERRED EMBODIMENT AND BEST MODE

Figure 1:
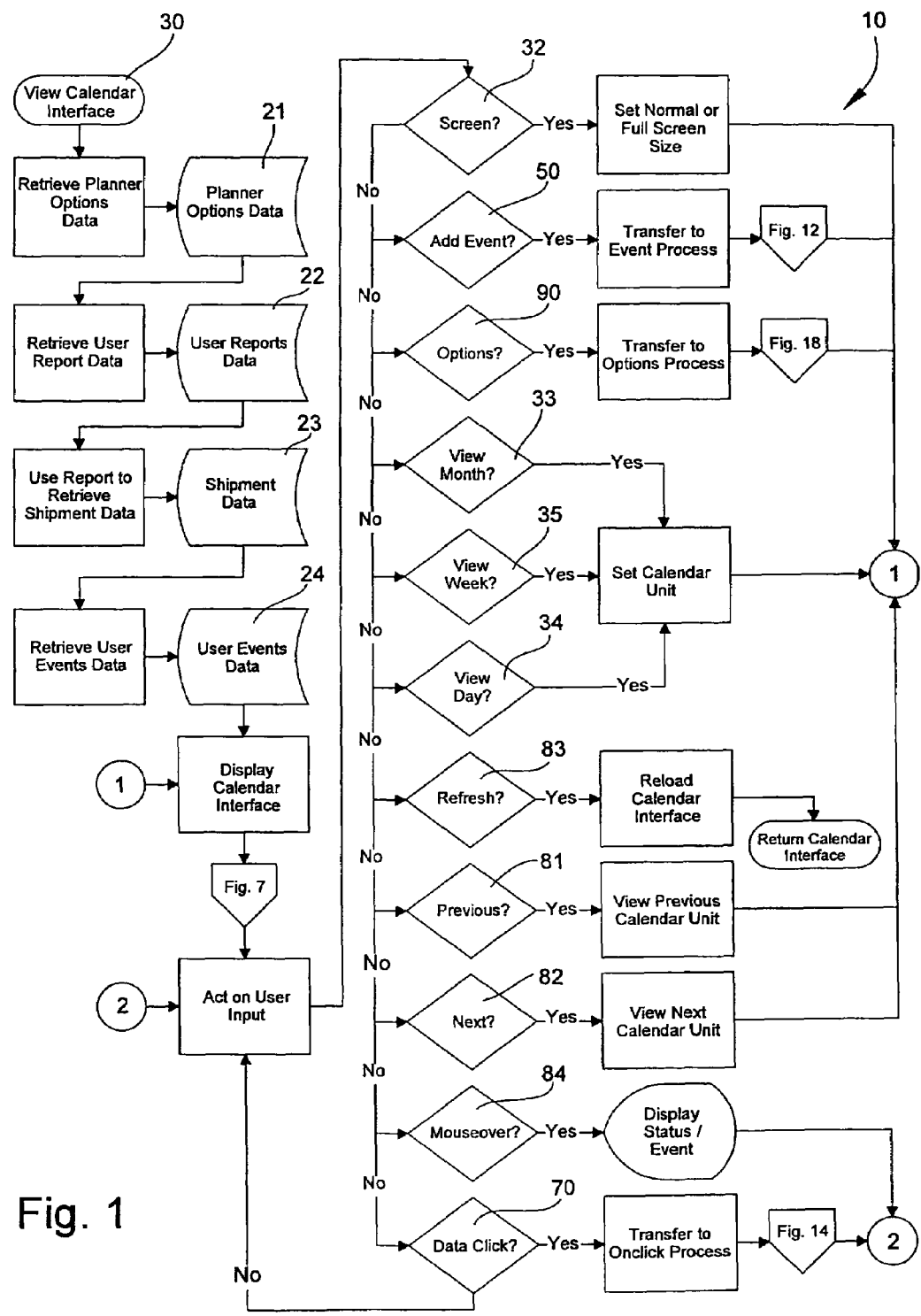
FIG. 1 is a flow diagram illustrating the overall operation of an electronic shipment planner according to one preferred embodiment of the invention.
Figure 2:
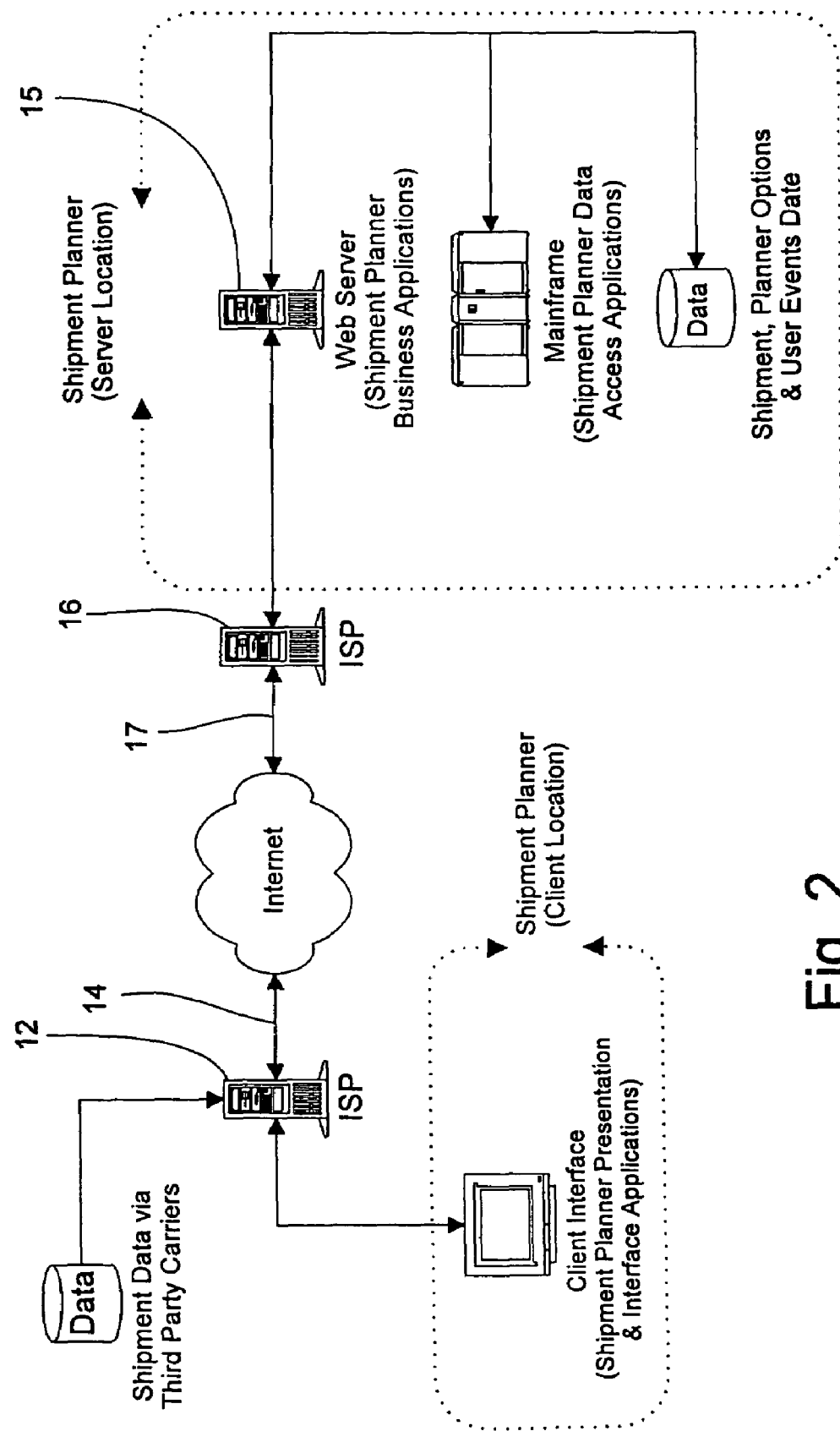
FIG. 2 is a general schematic diagram showing communication of the client interface with the system Web server.

Referring now specifically to the drawings, an electronic shipment planner according to the present invention is illustrated in the flow diagram of FIG. 1 and referenced generally at 10. The shipment planner 10 is applicable for presenting shipment and scheduling information and personal events information to a user in a convenient, easy to read, interactive calendar display format. As indicated in FIG. 2, users access the shipment planner 10 from a client interface 11 via an Internet service provider 12 and suitable communications equipment 14, such as a modem. The client interface 11 may be any application, such as a PC Web browser, which understands computer markup language, such as HTML and Dynamic-HTML. The shipment planner 10 is made available to the client interface 11 from a system Web server 15 via Internet service provider 16 and standard communications equipment 17. Data is supplied to the shipment planner on or off site through the Internet. According to one embodiment, users access the shipment planner 10 from a workstation including a computer, keyboard, mouse, monitor, and modem connection. The shipment planner 10 provides ready and convenient access to shipment delivery and tracking information from any location in the world, on any day of the week, and at any time of day.

Referring now to the flow diagram of FIG. 1, the shipment planner 10 includes four data repositories 21, 22, 23, and 24, respectively: (1) "display options data"—contains display parameters used to customize how the shipment planner is displayed to the user; (2) "user reports data"—contains report profiles which query the shipment data to create customized user reports; (3) "shipment data"—contains all shipment and scheduling information; (4) "user events data"—contains personal events information.

Display Options

Figure 3:
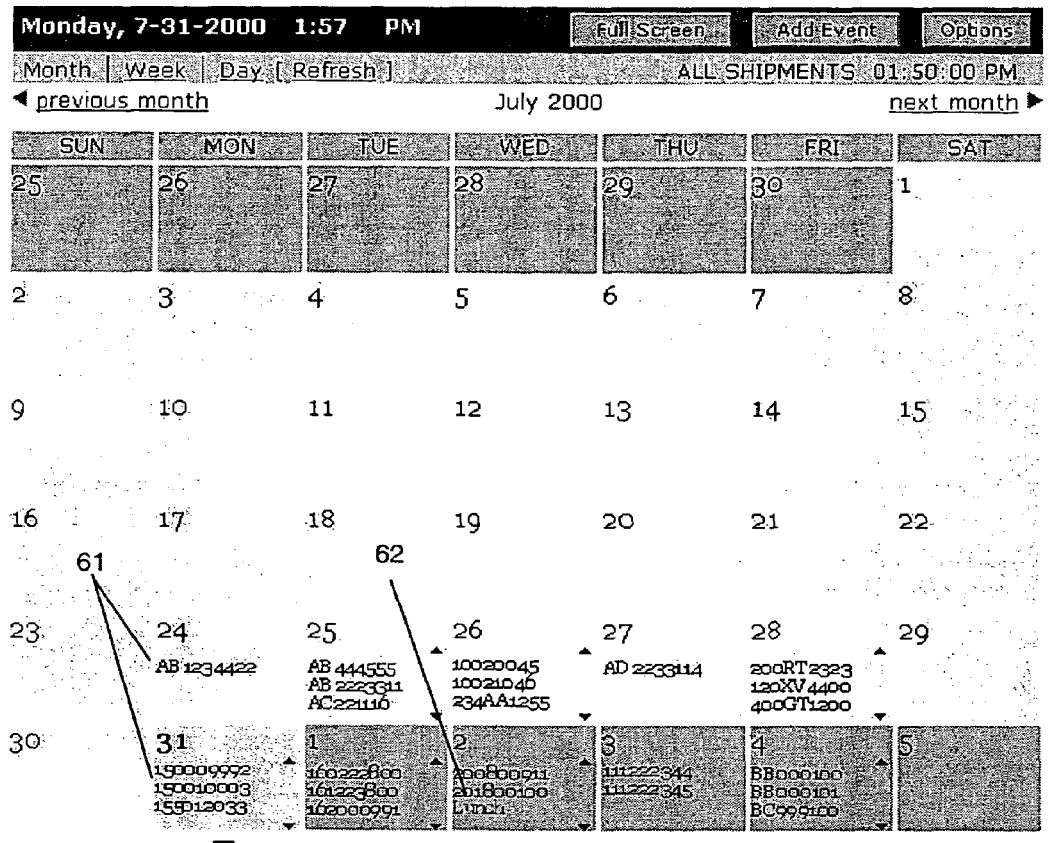
FIG. 3 is a screen shot of the calendar interface in a month display format.
Figure 4:
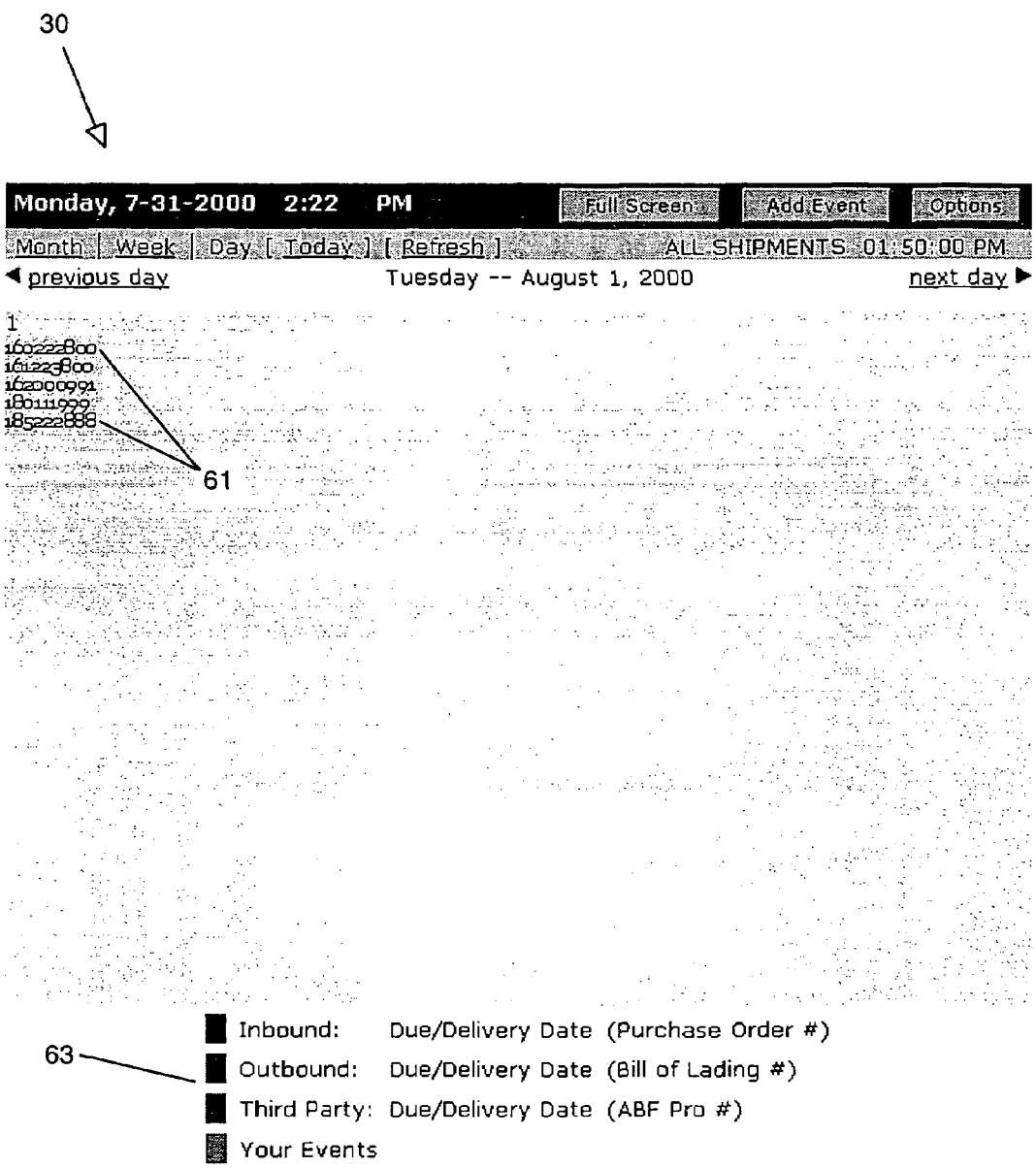
FIG. 4 is a screen shot of the calendar interface in a day display format.

Upon accessing the shipment planner 10 via the client interface 11, preprogramed default display parameters are retrieved from the display options data repository 21. The display parameters define a calendar interface 30, shown in FIGS. 3-6, in the form of a convenient, easy-to-read calendar. After the initial display, the user can readily modify the format of the calendar interface 30 by selecting various customization options indicated in the flow diagram of FIG. 7. Referring to FIG. 7, from the default screen shown in FIG. 3, the user chooses to view the calendar interface 30 in a desired screen format 32 including either a "normal" format which displays a page header and footer, or a "full screen" format which omits the page header and footer. In the full screen format, the user can further elect to set the display width based on the screen width or on a preprogramed default parameter. The user then chooses to view the accessed shipment data and personal events information in either a month, day, or week display format, 33, 34, and 35, respectively. The default setting shown in FIG. 3 illustrates a month display format 33. FIG. 4 illustrates a day display format 34. The week display 35, shown in FIGS. 5 and 6, can be viewed in either a horizontal or a vertical format, 36 and 37, respectively.

User Report Data

Referring to FIGS. 8-11, customized profiles are created using a report data interface 40. The user reports are titled by the user for subsequent retrieval, and are stored in the user reports data repository 22. The user may choose to create a report based on numerous options, including: the shipment delivery status 41 (delivered, undelivered, delayed, delivered with an exception); the payment status 42 (paid, unpaid, overdue); the paying party 43 (collect or prepaid); date restrictions 44 (pickup, due, appointment, delivery); past or future date time frame 45 and 46 (yesterday, tomorrow, last week, next week, last # of days, next # of days, week-to-date, month-to-date, date range); inbound options 47 (origin state, origin zip code, shipper location, shipper state, shipper zip code, shipper serving station); outbound options 48 (destination state, destination zip code, consignee location, consignee state, consignee zip code, consignee serving station); and third party options 49 (paying location, origin state, origin zip code, origin station, destination state, destination zip code, destination station).

Figure 9:
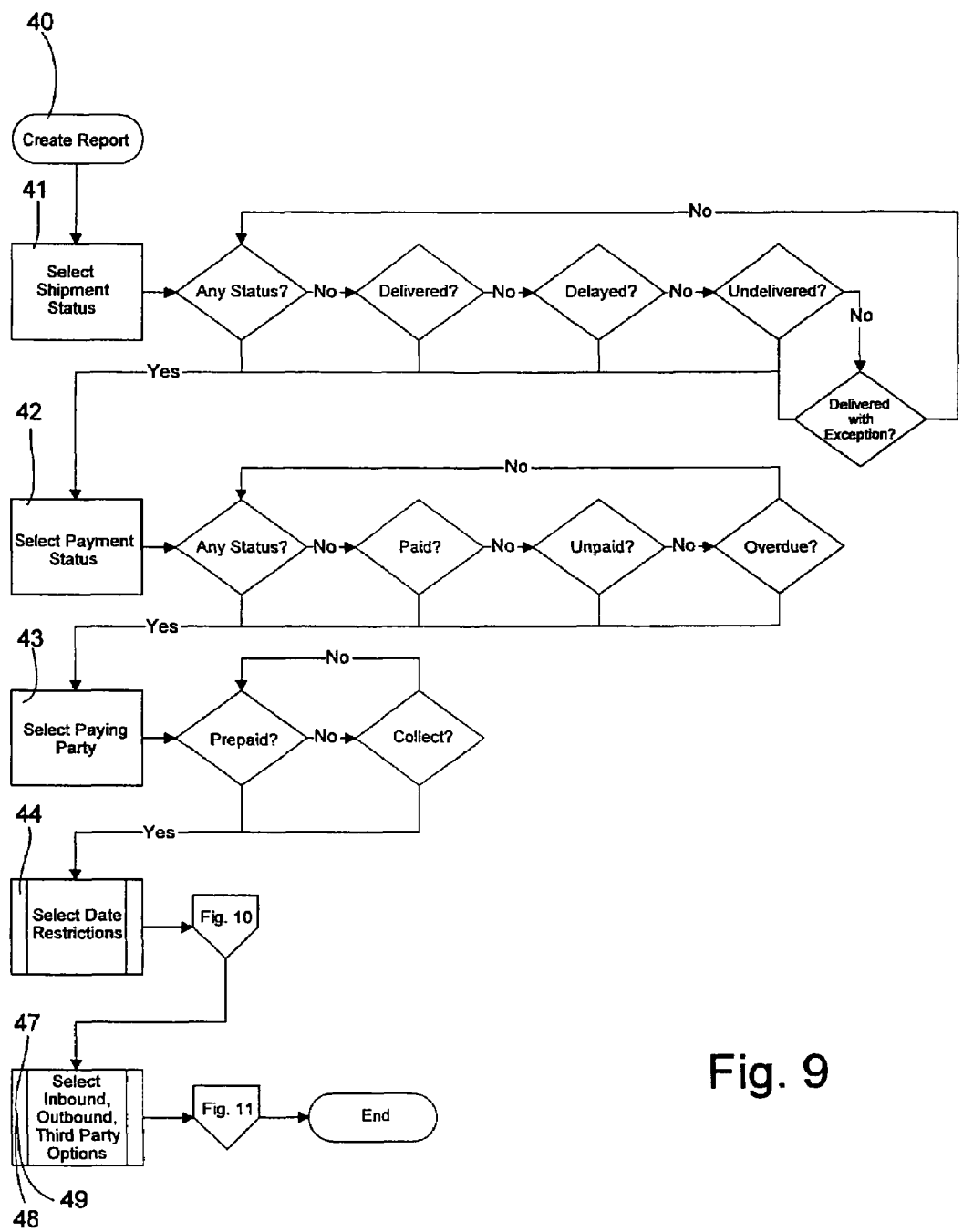
FIG. 9 is a flow diagram illustrating steps of the process for creating the customized shipment report.

As shown in FIG. 9, to create a customized report, the user first selects the shipment status 41 for desired shipments to be retrieved in the report. The user chooses between delivered shipments, delayed shipments, undelivered shipments, shipments delivered with exception, or shipments of any status. After this selection, the user then chooses the shipment payment status 42 for shipments which are either paid, unpaid, overdue, or of any payment status. The user then selects the paying party 43 choosing between shipments which are either prepaid by the paying party, or those which require collection from the paying party.

Figure 10:
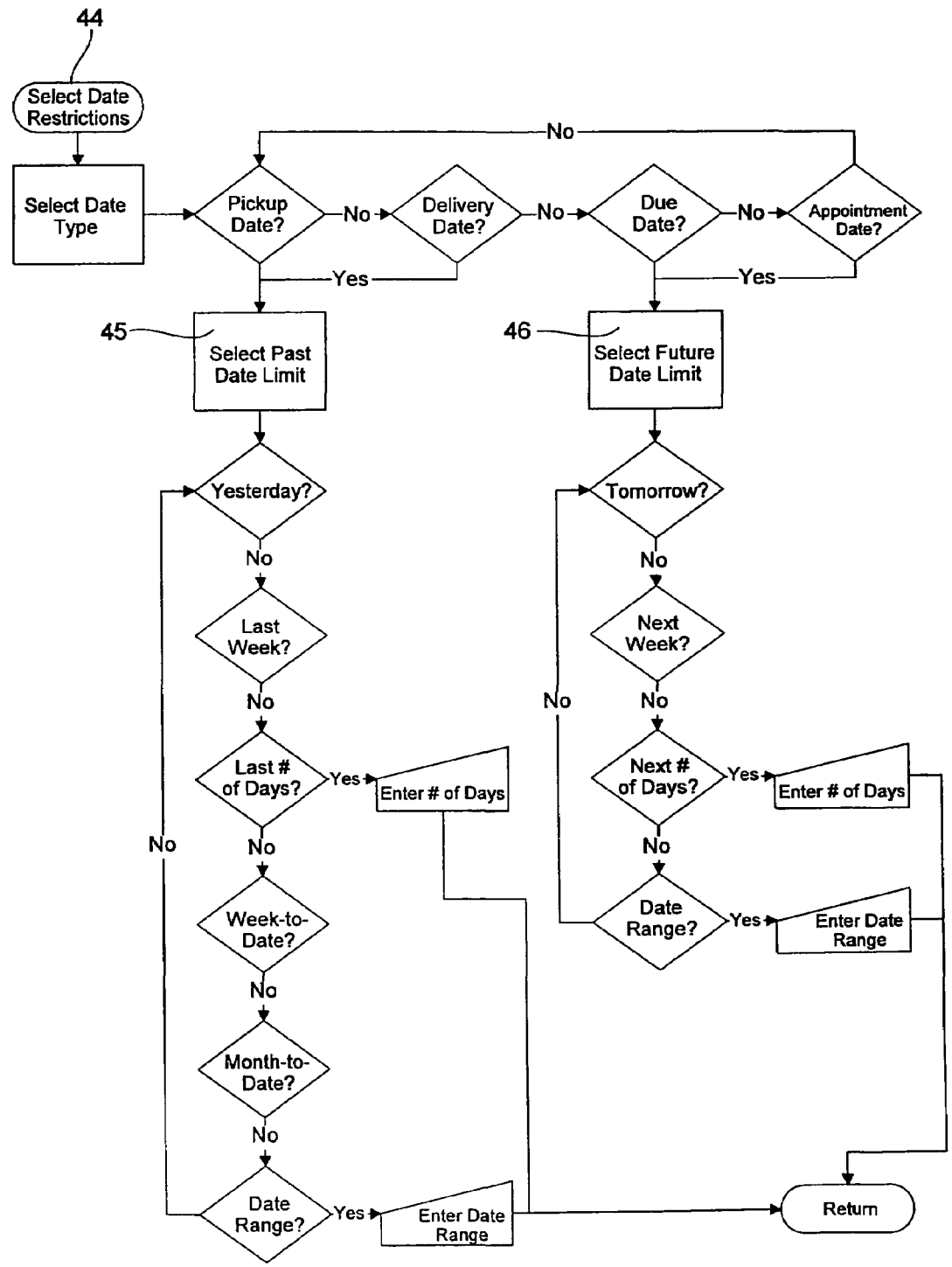
FIGS. 10 and 11 are flow diagrams illustrating further steps of the process for creating the customized shipment report.

Shipment date restrictions 44 are selected, as indicated in FIG. 10. The user first selects the shipment date type—either the pickup date, the delivery date, the due date, or the appointment date. For pickup and delivery date shipments, the user further selects a past date limit 45 including yesterday, last week, a selected past number of days, last week-to-date, last month-to-date, or a specified date range. For due date and appointment date shipments, the user further selects a future date limit 46 including tomorrow, next week, a selected number of days in the future, or a specified future date range.

Figure 11:
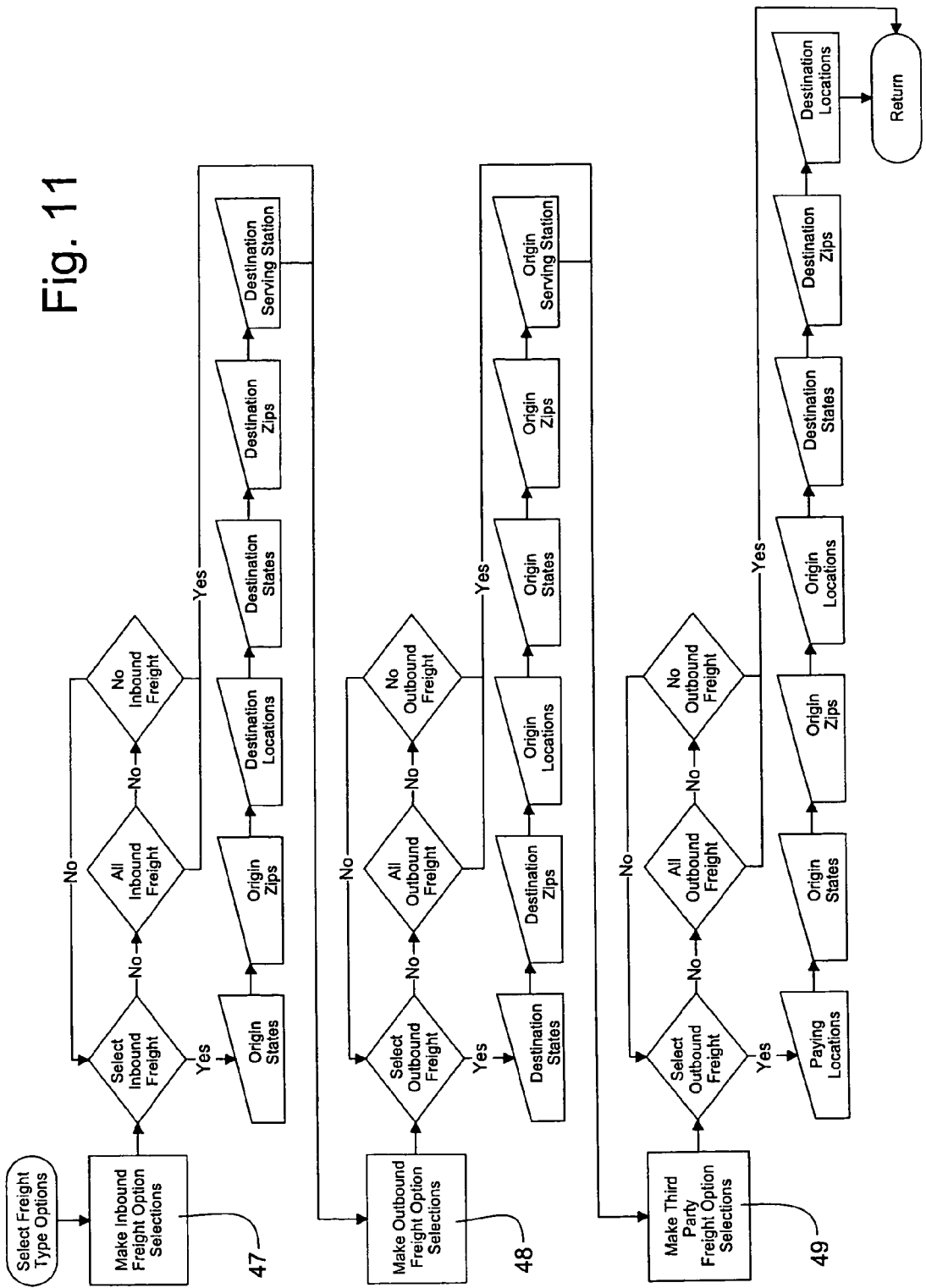

Referring to FIG. 11, after selecting the shipment date restrictions 44, the user selects inbound, outbound, and third party options, 47, 48, and 49. The user starts with freight type options. For the inbound freight option selections 47, the user chooses between select inbound freight, all inbound freight, and no inbound freight. Select inbound freight includes one or more of the origin states, origin zip codes, destination locations, destination states, destination zip codes, and destination serving station. Next, the user makes outbound freight options selections 48. For select outbound freight, the user chooses one or more of the destination states, destination zip codes, origin locations, origin states, origin zip codes, and origin serving station. Finally, the user makes third party freight option selections 49. For select inbound freight, the user chooses one or more of the paying locations, origin states, origin zip codes, origin locations, destination states, destination zip codes, destination locations.

Shipment Data

Shipment data is entered into the electronic shipment data repository 23 which can be updated at any time by authorized field and general office personnel via electronic data interchange (EDI) or the Internet. Preferably, shipment data is entered into the repository at the time a service center receives a shipper's bill of lading. The customized user reports, described above, operate to electronically filter the shipment data contained in the shipment data repository to provide only the selected information requested by the user.

Personal Events

Figure 12:
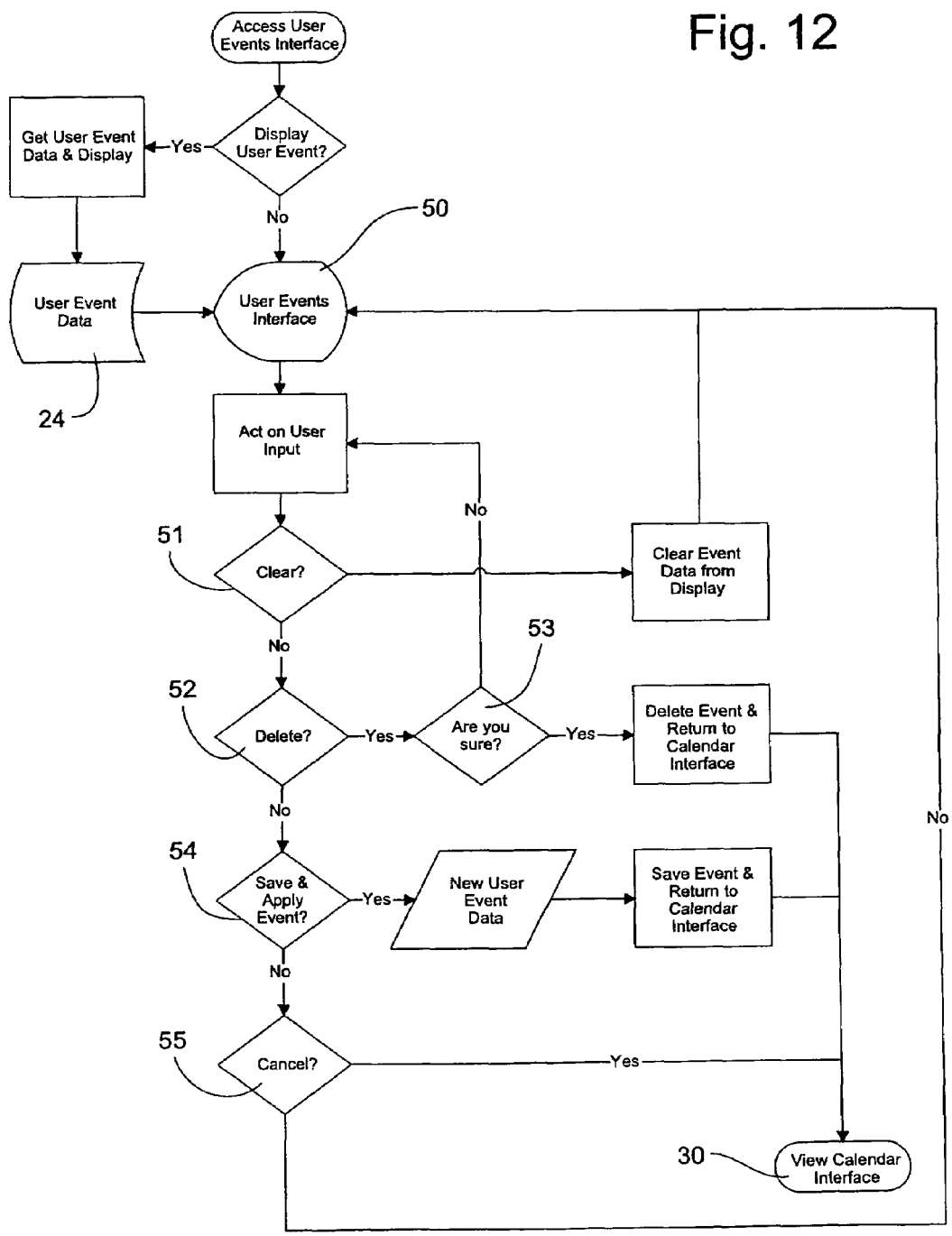
FIG. 12 is a flow diagram illustrating the process for adding a user event to the shipment planner.

Referring now to the flow diagram of FIG. 12, mouse-clicking on the "Add Event" icon 50 displayed in the calendar interface 30 allows the user to add new personal events to the shipment planner 10. From a user events interface 50, shown in FIG. 13, the user inputs the title of the event, a description of the event, the day of the event, the starting time, and the ending time. Once this input is completed, the user then elects to clear, delete, save and apply, or cancel the event. Mouse-clicking on the "Clear" icon 51 clears the event data from display and returns the user to the events interface. Mouse-clicking on the "Delete" icon 52 triggers a confirmation query 53 asking the user to confirm the deletion. When confirmed, the event data is deleted and the user is returned to the calendar interface 30. Mouse-clicking on the "Save & Apply" icon 54 saves the inputted event data in the user events data repository 24, and transfers the user back to the calendar interface 30. Mouse-clicking on the "Cancel" icon 55 transfers the user directly to the calendar interface 30 without saving the new events data. Previously entered events data is stored in the user events data repository 24.

Using the Shipment Planner 10

The user navigates the shipment planner 10 from his workstation using the attached mouse and a convenient point-and-click, menu-driven software. Upon accessing the shipment planner 10, the selected customized user report electronically filters the information contained in the shipment data repository 23, as described above, to display only the desired shipment data in the calendar interface 30. From the calendar interface 30, the user can choose to view shipment and scheduling information or personal events data by mouse-clicking directly on a shipment data link 61 or a personal events link 62 appearing on the screen (See FIGS. 3-6). The links 61 and 62 are displayed in the calendar interface 30 on certain days of the month corresponding to their respective event dates. In one embodiment, the shipment data link 61 is a shipment reference code, such as an internal system reference number, a bill of lading number, or a purchase order number, which is associated with certain shipment data and scheduling information contained in the shipment data repository 23. When a shipment reference code is selected, the client interface 11 accesses the associated shipment and scheduling information and downloads this information for display to the user. The personal events data link 62 is preferably a one or two word event title. When an event title is selected, the client interface 11 accesses the associated personal events information contained in the user events data repository 24 and downloads this information for display to the user.

For convenient viewing, the shipment reference codes and event titles are preferably color-coded, as indicated in the legend 63, to readily distinguish between inbound shipments, outbound shipments, third party shipments, and personal events. For example, inbound shipments may be designated by the color blue, outbound shipments designated by red, third party shipments designated by green, and personal events designed by orange.

Figure 14:
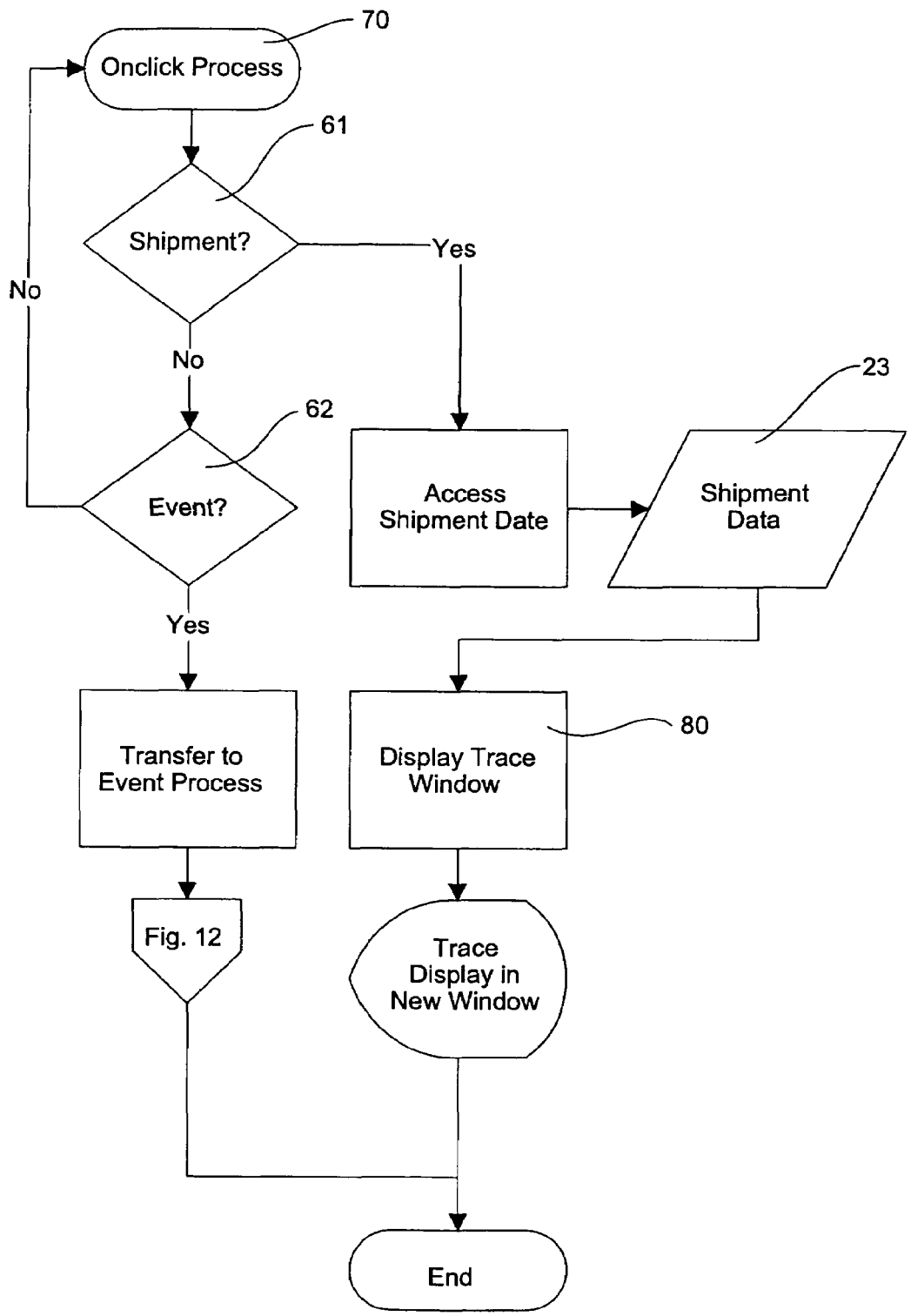
FIG. 14 is a flow diagram illustrating the "onclick" process for displaying shipment and event information from the calendar interface.
Figure 15:
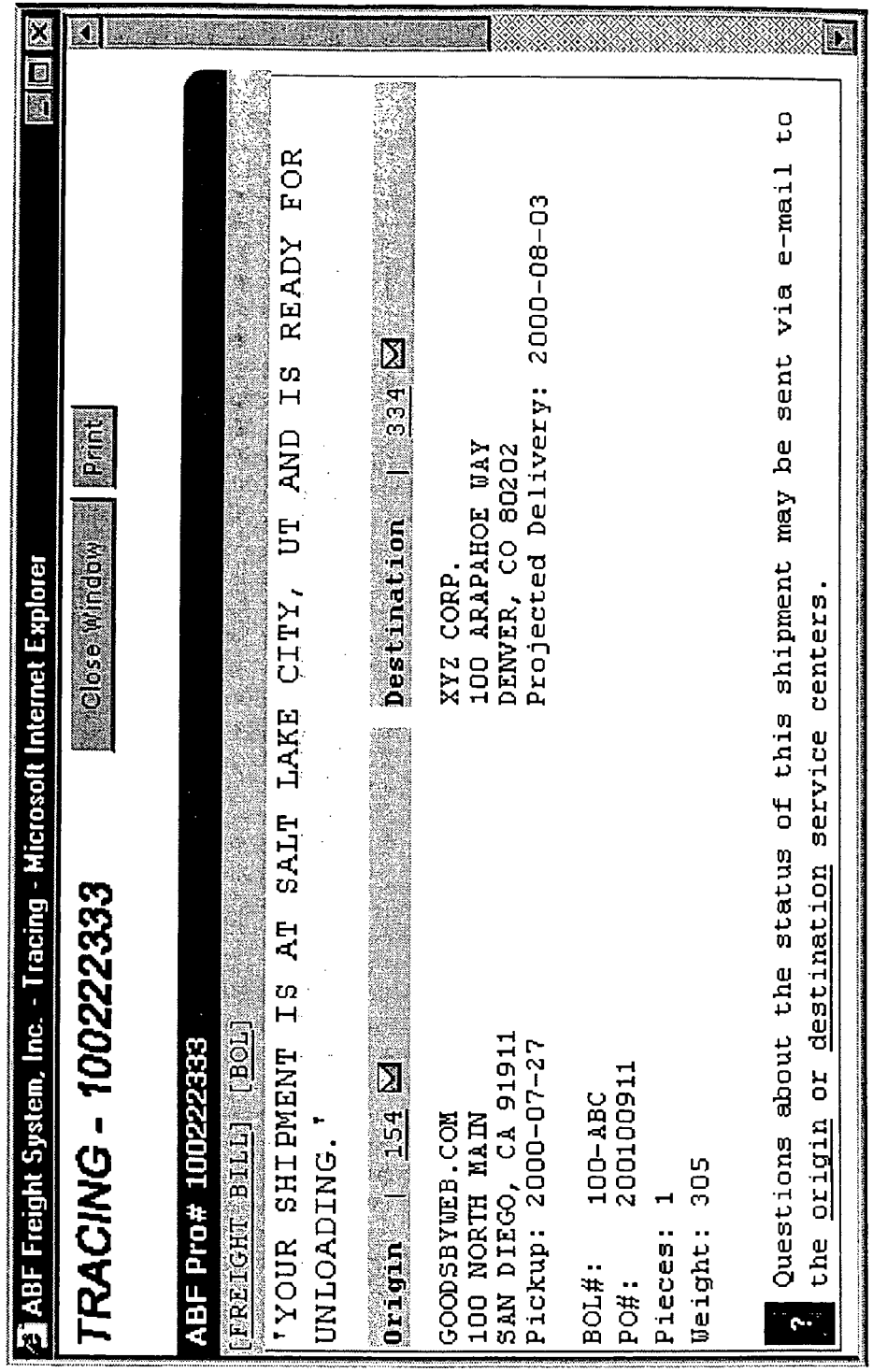
FIG. 15 is a screen shot of a pop-up window providing shipment tracing information.

Referring to FIGS. 14 and 15, using an "onclick process" 70 the user mouse-clicks directly on either a shipment data link 61 or personal events data link 62 in the calendar interface 30, as previously described. Upon selecting a shipment data link 61, the client interface 11 downloads the associated shipment data from the shipment data repository 23 and a pop-up trace window 80, shown in FIG. 15, is displayed to the user. The trace window 80 provides detailed information regarding the selected shipment, including its present location, shipment origin, destination, bill of lading number, purchase order number, number of pieces, shipment weight, and the e-mail addresses of the origin and destination service centers. If a personal events data link 62 is selected, the client interface 11 downloads the associated event data from the user events data repository 24. The selected event information is then displayed, as shown in FIG. 13. This information indicates the event title, a description of the event, the day of the event, the event starting time, and the event ending time.

Figure 16:
FIG. 16 is a pop-up window displayed when "mousing over" a shipment reference code.
Figure 17:
FIG. 17 is a pop-up window displayed when "mousing over" a user events reference code.

Referring again to FIGS. 1 and 3, from the calendar interface 30, the user can further elect to view shipment data and events information for preceding and succeeding calendar units by mouse-clicking on the "Previous" and "Next" icons, 81 and 82, respectively. The "Refresh" icon 83 reloads the calendar interface. By "mousing-over" 84 (without clicking) shipment reference code and event titles displayed in the calendar interface 30, respective pop-up windows 85 and 86 provide a brief summary of the shipment status, as shown in FIG. 16, and the personal event, as shown in FIG. 17. The shipment summary includes an internal system reference number, a purchase order number, a concise status statement, and the name of the person signing the delivery. The event summary includes the title of the event, a brief description, and the duration of the event.

Changing the Calendar Interface 30

Figure 18:
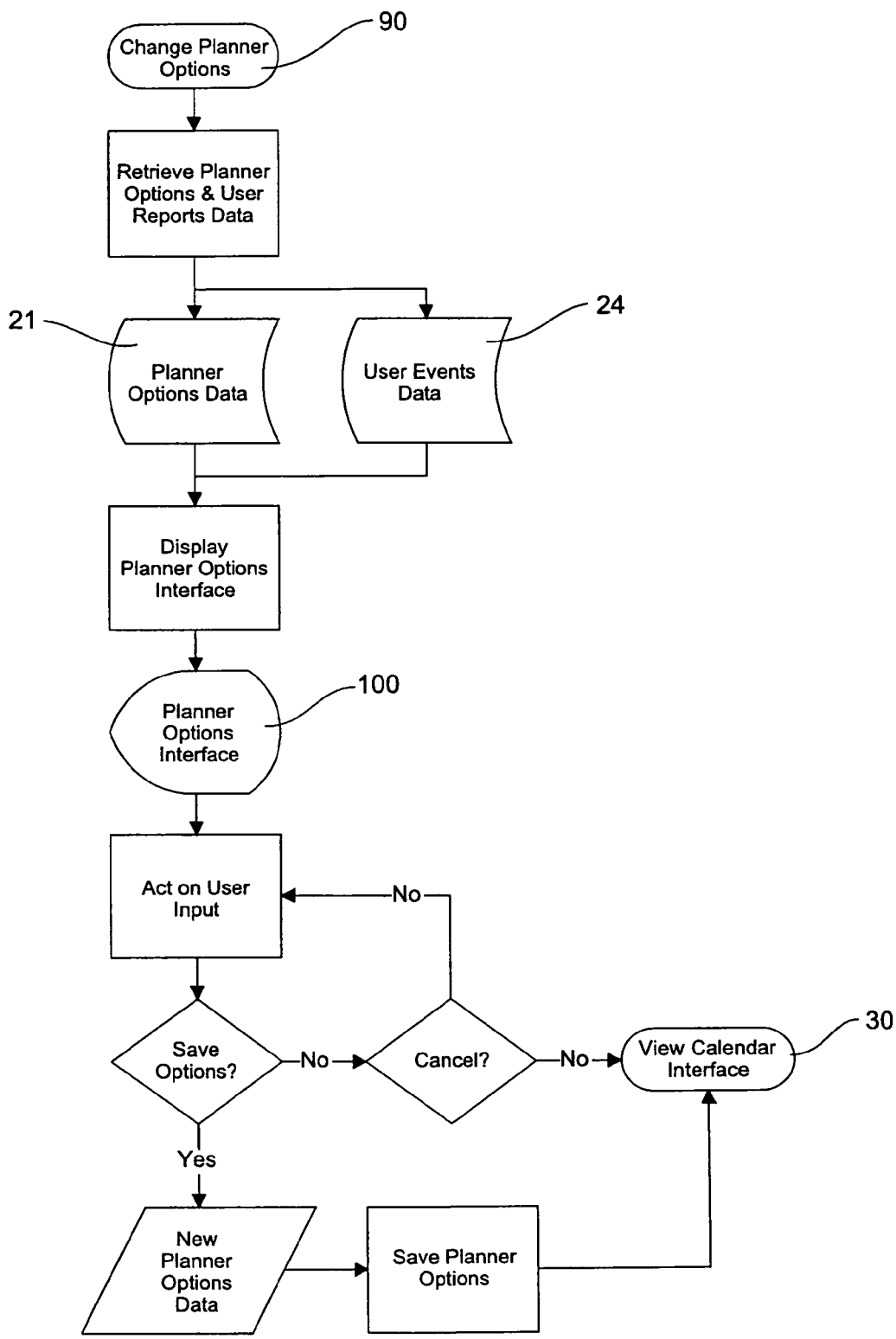
FIG. 18 is a flow diagram demonstrating the process for changing the display of the calendar interface.

Referring to FIGS. 18 and 19, from the calendar interface 30, the user can select the "Options" icon 90 to change the default shipment reference codes which appear on the calendar interface 30 upon accessing the shipment planner 10, and the actual dates upon which the shipment reference codes are posted. In order to change the default settings, the client interface 11 accesses both the display options data repository 21 to display the current options selected, and the user reports data repository 22 to display the available shipment reports.

A planner options interface 100, shown in FIG. 19, allows the user to customize the appearance of the calendar interface 30 by first selecting which shipment report to access. Preferably, a drop-down window displays all previously entered reports stored in the user reports data repository for convenient selection by the user. After selecting the desired report, the user then chooses whether to display one or more of inbound, outbound, or third party shipments contained in the report, and whether the shipments will be displayed to the calendar interface on either the due or delivery date, or the shipment date. The shipment reference code to be displayed is then selected from either a purchase order number, a bill of lading number, or an internal system reference number. The user then selects a default display by month, day, or week with a further option to display the calendar interface without header and footer, or to expand the calendar interface to screen size based on the user's monitor. Finally, the user elects to started the display with either the current date or the date of the first active shipment. For the week display, the user can further elect a horizontal format (See FIG. 5) or a vertical format (See FIG. 6). Once the report data selections are completed, the user can either save the selections and return to the calender interface, or cancel the selections.

An electronic shipment planner is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. An electronic shipment planner adapted for electronically presenting shipment and scheduling information to a user, the shipment and scheduling information including at least one shipment event date, said shipment planner comprising:
   (a) a shipment data repository containing shipment and scheduling information for inbound freight and outbound freight;
   (b) a system interface communicating with said shipment data repository;
   (c) a calendar display interface for displaying said shipment planner to the user in a calendar format, said calendar format comprising a tabular register of days;
   (d) a plurality of interactive shipment data links contained within certain days displayed in said calendar display interface, and electronically associated with the shipment and scheduling information, said plurality of shipment data links cooperating with said system interface as commanded by the user to access and retrieve the associated shipment and scheduling information contained in said shipment data repository, and said plurality of shipment data links comprising:
      (i) a plurality of inbound freight data links for accessing and retrieving associated inbound freight information from said shipment data repository;
      (ii) a plurality of outbound freight data links for accessing and retrieving associated outbound freight information from said shipment data repository; and
      (iii) said calendar display interface further comprising a first data code visually distinguishing all of said inbound freight data links contained within said tabular register of days, and a second data code visually distinguishing all of said outbound freight data links contained within said tabular register of days;
   whereby said shipment planner defines an interactive visual reference adapted for managing and tracking shipments.

2. An electronic shipment planner according to claim 1, and comprising shipment data input means communicating with said shipment data repository for loading shipment and scheduling information into said shipment data repository.

3. An electronic shipment planner according to claim 1, wherein said system interface comprises a Web browser.

4. An electronic shipment planner according to claim 1, wherein at least one of said shipment data links comprises a predetermined portion of the shipment and scheduling information.

5. An electronic shipment planner according to claim 1, wherein at least one of said shipment data links comprises a shipment reference code.

6. An electronic shipment planner according to claim 5, wherein said shipment reference code is selected from the group consisting of a bill of lading number and a purchase order number.

7. An electronic shipment planner according to claim 1, wherein said first and second data codes comprise color-coding to readily distinguish between inbound and outbound shipments.

8. An electronic shipment planner according to claim 7, and comprising a legend for indicating the color-code for each inbound shipment and outbound shipment.

9. An electronic shipment planner according to claim 1, and comprising a display options data repository containing format parameters for customizing the format of said calendar display interface.

10. An electronic shipment planner according to claim 9, and comprising a display options data interface communicating with said display options data repository for setting desired format parameters contained in said display options data repository.

11. An electronic shipment planner according to claim 1, and comprising an input device for selecting said interactive shipment data link from said calendar display interface.

12. An electronic shipment planner according to claim 11, wherein said input device comprises a computer mouse.

13. An electronic shipment planner according to claim 1, and comprising a report data repository containing profile parameters for displaying the shipment and scheduling information in a customized user report.

14. An electronic shipment planner according to claim 13, and comprising a report data interface communicating with said report data repository for setting desired profile parameters contained in said report data repository.

15. An electronic shipment planner according to claim 1, and comprising a personal event data repository containing personal event information of the user, the personal event information being associated with a personal event date.

16. An electronic shipment planner according to claim 15, and comprising a personal event data interface communicating with said personal event data repository for loading personal event information into said personal event data repository.

17. An electronic shipment planner according to claim 16, and comprising an interactive personal event data link electronically associated with the personal event information, and cooperating with said system interface as commanded by the user to access and retrieve the associated personal event information contained in said personal event data repository.

18. An electronic shipment planner according to claim 17, wherein said personal event data link comprises a predetermined portion of the personal event information.

19. An electronic shipment planner according to claim 17, wherein said personal event data link comprises a title of the personal event information.

20. An electronic shipment planner adapted for electronically presenting shipment and scheduling information to a user, the shipment and scheduling information including at least one event date, said shipment planner comprising:
   (a) a shipment data repository containing shipment and scheduling information for inbound freight and outbound freight;
   (b) a system interface communicating with said shipment data repository;
   (c) a calendar display interface for displaying said shipment planner to the user in a calendar format, said calendar format comprising a tabular register of days;

(d) a plurality of interactive shipment data links contained within certain days displayed in said calendar display interface, and electronically associated with the shipment and scheduling information, said plurality of shipment data links cooperating with said system interface as commanded by the user to access and retrieve the associated shipment and scheduling information contained in said shipment data repository, and said plurality of shipment data links comprising:
  (i) a plurality of inbound freight data links for accessing and retrieving associated inbound freight information from said shipment data repository; and
  (ii) a plurality of outbound freight data links for accessing and retrieving associated outbound freight information from said shipment data repository;
(e) a personal event data repository containing personal event information of the user, the personal event information being associated with a personal event date;
(f) a plurality of interactive personal event data links contained within certain days displayed in said calendar display interface, and electronically associated with the personal event information of the user, said plurality of personal event data links cooperating with said system interface as commanded by the user to access and retrieve the associated personal event information contained in said personal event data repository;
(g) said calendar display interface further comprising a first data code visually distinguishing all of said inbound freight data links contained within said tabular register of days, a second data code visually distinguishing all of said outbound freight data links contained within said tabular register of days, a third data code visually distinguishing all of said personal event data links contained within said tabular register of days; whereby said shipment planner defines an interactive visual reference adapted for managing and tracking shipments; and
(h) a legend for indicating the data code for each of said shipment data and personal event data links.

* * * * *

UNITED STATES PATENT AND TRADEMARK OFFICE
CERTIFICATE OF CORRECTION

PATENT NO.         : 7,546,520 B2                                              Page 1 of 7
APPLICATION NO.    : 11/208193
DATED              : June 9, 2009
INVENTOR(S)        : Davidson et al.

It is certified that error appears in the above-identified patent and that said Letters Patent is hereby corrected as shown below:

Delete column 1 line 1 through column 12 line 18 and insert column 1 line 1 through column 12 line 14 as attached Signed and Sealed this
Twenty-sixth Day of April, 2011

David J. Kappos
*Director of the United States Patent and Trademark Office* though
ELECTRONIC SHIPMENT PLANNER

TECHNICAL FIELD AND BACKGROUND OF THE INVENTION

This invention relates to an interactive electronic shipment planner. The invention is a computer based application that enables efficient management and tracking of shipments using a convenient and easy to read calendar interface. The invention can be accessed globally via the Internet at anytime using standard computer hardware, software, and communications equipment. The invention is further applicable for personal events scheduling. Moreover, the calendar display format of the shipment planner can be readily customized to suit the needs of the user. Unlike traditional planners, the present invention effects electronic filtering of information contained in a data repository to display only a select portion of the information to the user.

SUMMARY OF THE INVENTION

Therefore, it is an object of the invention to provide an electronic shipment planner which provides ready and convenient management and tracking of shipments.

It is another object of the invention to provide an electronic shipment planner which provides shipment data in an easy to read, interactive calendar format.

It is another object of the invention to provide an electronic shipment planner which can be accessed globally via the Internet.

It is another object of the invention to provide an electronic shipment planner which utilizes standard compute hardware, software, and communications equipment.

It is another object of the invention to provide an electronic shipment planner which is applicable for personal events scheduling.

It is another object of the invention to provide an electronic shipment planner which electronically filters information contained in a data repository using customized electronic user reports to display only a select portion of the information to the user.

It is another object of the invention to provide an electronic shipment planner which promotes time and cost efficiency in the shipment industry.

These and other objects of the present invention are achieved in the preferred embodiments disclosed below by providing an electronic shipment planner adapted for electronically presenting shipment and scheduling information to a user. The shipment and scheduling information includes at least one shipment event date. The shipment planner is linked to a shipment data repository containing shipment and scheduling information. A system interface communicates with the shipment data repository. An interactive shipment data link is electronically associated with the shipment and scheduling information, and cooperates with the system interface as commanded by the user to access and retrieve the associated shipment and scheduling information contained in the shipment data repository. A calendar display interface displays the shipment planner to the user in a calendar format, such that the interactive shipment data link is provided on the shipment event date associated with the shipment and scheduling information.

According to another preferred embodiment of the invention, shipment data input means communicates with the shipment data repository for loading shipment and scheduling information into the shipment data repository.

According to yet another preferred embodiment of the invention, the system interface is a Web browser, such as "Netscape Navigator" or "Microsoft Explorer".

According to yet another preferred embodiment of the invention, the shipment data link is a predetermined portion of the shipment and scheduling information.

According to yet another preferred embodiment of the invention, the shipment data link is a shipment reference code.

According to yet another preferred embodiment of the invention, the shipment reference code is selected from the group consisting of a bill of lading number and a purchase order number.

According to yet another preferred embodiment of the invention, a plurality of interactive shipment data links are electronically associated with at least one of an inbound shipment, an outbound shipment, and a third party shipment.

According to yet another preferred embodiment of the invention, the plurality of interactive shipment data links are color-coded to readily distinguish between inbound, outbound, and third party shipments.

According to yet another preferred embodiment of the invention, a legend is provided for indicating the color-code for each inbound shipment, outbound shipment, and third party shipment.

According to yet another preferred embodiment of the invention, a display options data repository contains format parameters for customizing the format of the calendar display interface.

According to yet another preferred embodiment of the invention, a display options data interface communicates with the display options data repository for setting desired format parameters contained in the display options data repository.

According to yet another preferred embodiment of the invention, an input device selects the interactive shipment data link from the calendar display interface.

According to yet another preferred embodiment of the invention, the input device is a computer mouse.

According to yet another preferred embodiment of the invention, a report data repository contains profile parameters for displaying the shipment and scheduling information in a customized user report.

According to yet another preferred embodiment of the invention, a report data interface communicating with the report data repository for setting desired profile parameters contained in the report data repository.

According to yet another preferred embodiment of the invention, a personal event data repository contains personal event information of the user. The personal event information is associated with a personal event date.

According to yet another preferred embodiment of the invention, a personal event data interface communicates with the personal event data repository for loading personal event information into the personal event data repository.

According to yet another preferred embodiment of the invention, an interactive personal event data link is electronically associated with the personal event information, and cooperates with the system interface as commanded by the user to access and retrieve the associated personal event information contained in the personal event data repository.

According to yet another preferred embodiment of the invention, the personal event data link is a predetermined portion of the personal event information According to yet another preferred embodiment of the invention, the personal event data link is a title of the personal event information.

In another embodiment, the invention is an electronic shipment planner adapted for electronically presenting shipment and scheduling information to a user. The shipment and scheduling information includes at least one shipment event date. The shipment planner is linked to a shipment data repository containing shipment and scheduling information. A system interface communicates with the shipment data repository. An interactive shipment data link is electronically associated with the shipment and scheduling information, and cooperates with the system interface as commanded by the user to access and retrieve the associated shipment and scheduling information contained in the shipment data repository. A personal event data repository contains personal event information of the user. The personal event information is associated with a personal event date. An interactive personal event data link is electronically associated with the personal event information of the user, and cooperates with the system interface as commanded by the user to access and retrieve the associated personal event information contained in the personal event data repository. A calendar display interface displays the shipment planner to the user in a calendar format, such that the interactive shipment data link and the interactive personal event data link are provided on their respective shipment and personal event dates associated with the shipment and scheduling information and the personal events information. The shipment data link and the personal event data link are color-coded to readily distinguish between the associated shipment and scheduling information and the personal events information. A legend indicates the color-code for each of the shipment data and personal event data links.

In yet another embodiment, the invention is a method for electronically presenting shipment and scheduling information to a user. The shipment and scheduling information includes at least one shipment event date. The method includes the step of creating a shipment data repository containing shipment and scheduling information. A system interface is then provided to communicate with the shipment data repository. An interactive shipment data link is then electronically associated with the shipment and scheduling information. The shipment data link cooperates with the system interface as commanded by the user to access and retrieve the associated shipment and scheduling information contained in the shipment data repository. The shipment planner is then displayed to the user in a calendar format, such that the interactive shipment data link is provided on the shipment event date associated with the shipment and scheduling information.

According to another preferred embodiment of the invention, the method includes the step of providing a plurality of interactive shipment data links associated with at least one of an inbound shipment, an outbound shipment, and a third party shipment.

According to yet another preferred embodiment of the invention, the method includes the step of color-coding the plurality of interactive shipment data links to readily distinguish between inbound, outbound, and third party shipments.

According to yet another preferred embodiment of the invention, the method includes the step of providing a legend for indicating the color-code for each inbound shipment, outbound shipment, and third party shipment.

According to yet another preferred embodiment of the invention, the method includes the step of creating a personal event data repository containing personal event information of the user, the personal event information being associated with a personal event date.

According to yet another preferred embodiment of the invention, the method includes the step of electronically associating an interactive personal event data link with the personal event information of the user. The personal event data link cooperates with the system interface as commanded by the user to access and retrieve the associated personal event information contained in the personal event data repository.

In yet another embodiment, the invention is a computer readable memory medium, encoded with data representing a computer program, that can be used by a computer system to direct the computer system to execute a method for electronically presenting shipment and scheduling information to a user. The shipment and scheduling information includes at least one shipment event date. The medium includes a system interface communicating with a shipment data repository containing shipment and scheduling information. An interactive shipment data link is electronically associated with the shipment and scheduling information, and cooperates with the system interface as commanded by the user to access and retrieve the associated shipment and scheduling information contained in the shipment data repository. A calendar display interface displays a calendar format, such that the interactive shipment data link is provided on the shipment event date associated with the shipment and scheduling information.

According to another preferred embodiment of the invention, the memory medium includes a plurality of interactive shipment data links associated with at least one of an inbound shipment, an outbound shipment, and a third party shipment.

According to yet another preferred embodiment of the invention, the memory medium includes a display options data interface communicating with a display options data repository for selecting desired profile parameters contained in the display options data repository.

According to yet another preferred embodiment of the invention, the memory medium includes a report data interface communicating with a report data repository for selecting desired profile parameters contained in the report data repository.

According to another preferred embodiment of the invention, the memory medium includes an interactive personal event data link which is electronically associated with personal event information of the user, and which cooperates with the system interface as commanded by the user to access and retrieve the associated personal event information contained in a personal event data repository.

BRIEF DESCRIPTION OF THE DRAWINGS

Figure 5:
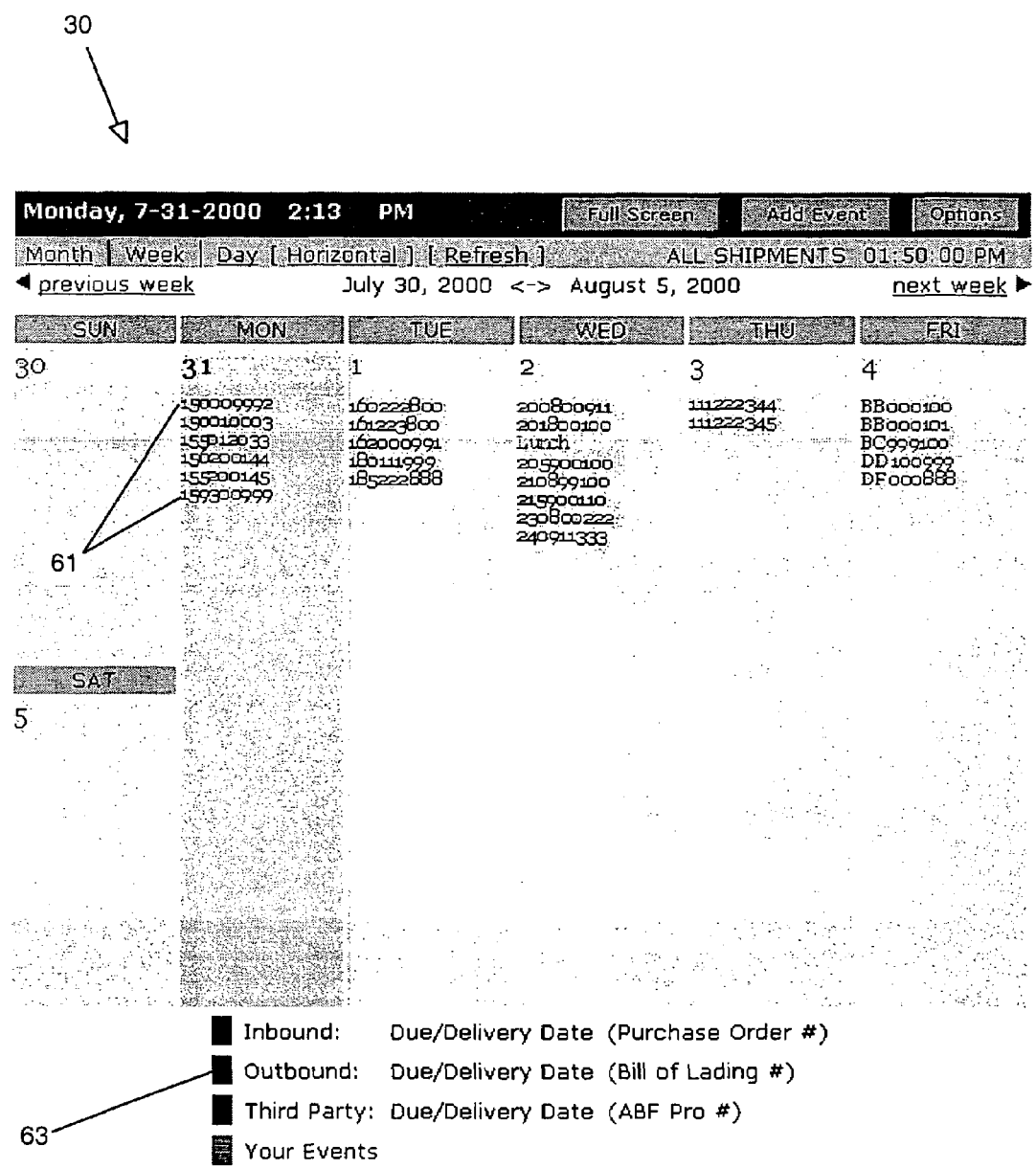
FIG. 5 is a screen shot of the calendar interface in a horizontal week display format.
Figure 6:
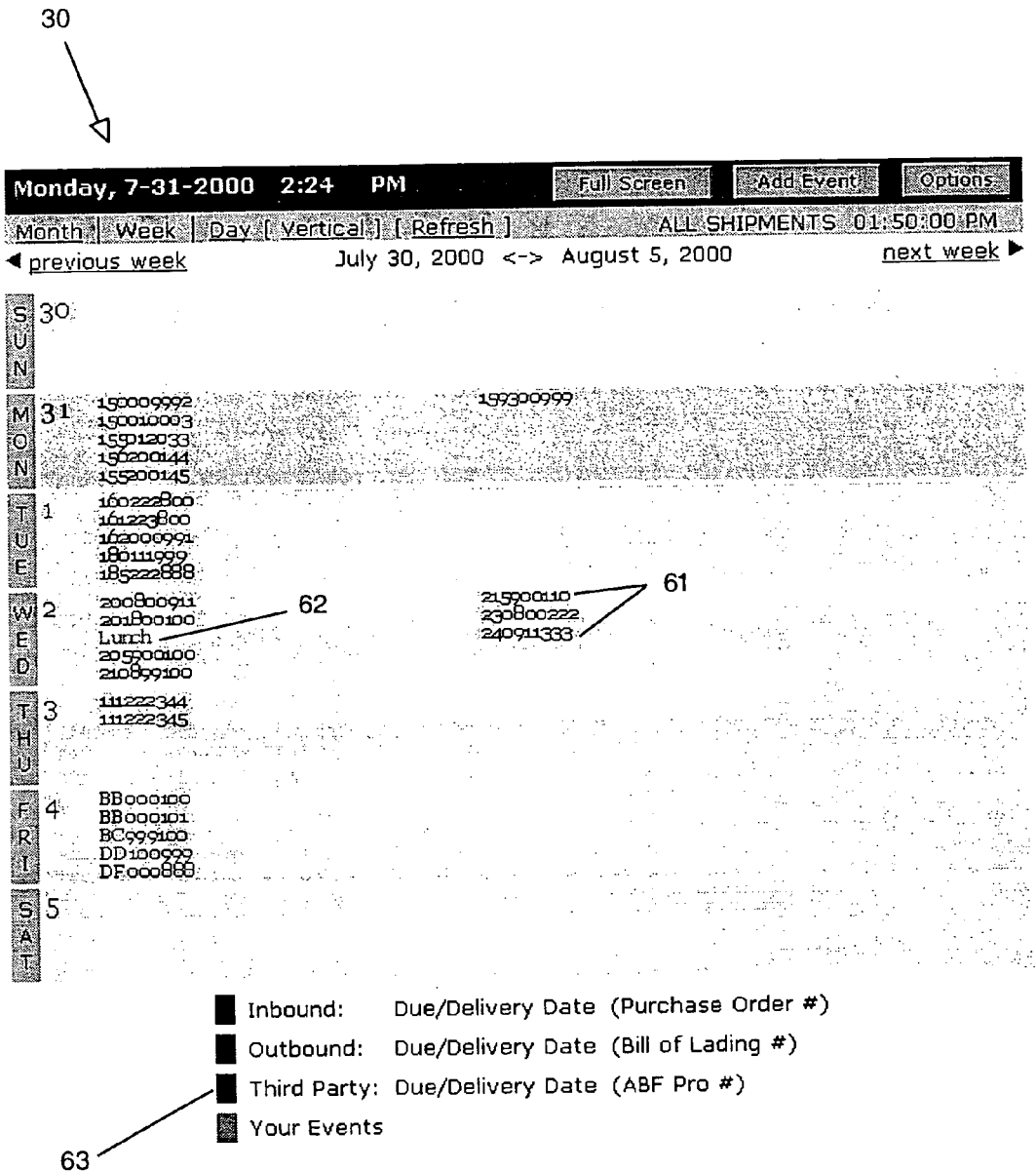
FIG. 6 is a screen shot of the calendar interface in a vertical week display format.
Figure 7:
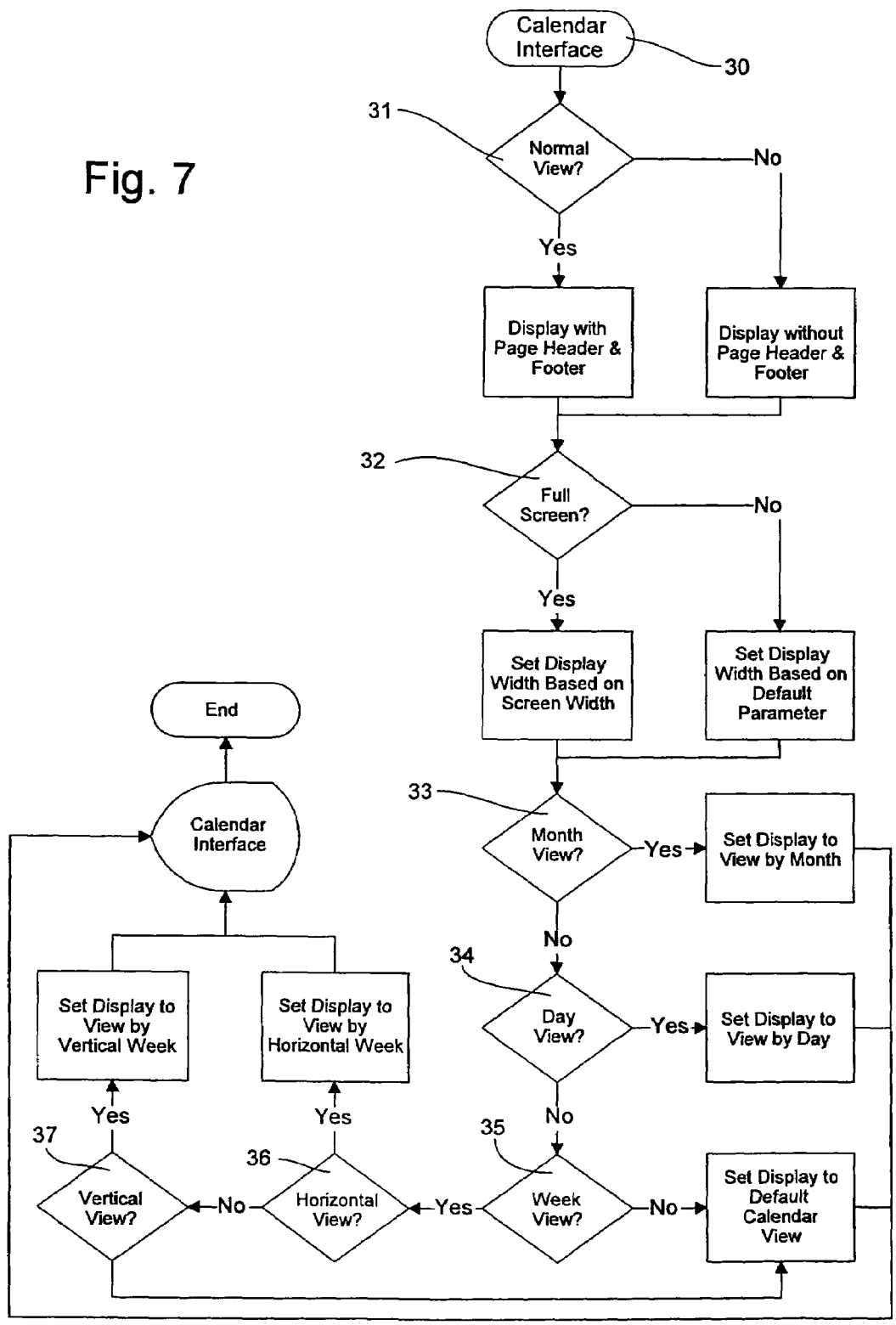
FIG. 7 is a flow diagram illustrating the process for customizing the calendar display format.

Some of the objects of the invention have been set forth above. Other objects and advantages of the invention will appear as the description proceeds when taken in conjunction with the following drawings, in which:

FIG. 1 is a flow diagram illustrating the overall operation of an electronic shipment planner according to one preferred embodiment of the invention;

FIG. 2 is a general schematic diagram showing communication of the client interface with the system Web server;

FIG. 3 is a screen shot of the calendar interface in a month display format;

FIG. 4 is a screen shot of the calendar interface in a day display format;

FIG. 5 is a screen shot of the calendar interface in a horizontal week display format;

FIG. 6 is a screen shot of the calendar interface in a vertical week display format;

FIG. 7 is a flow diagram illustrating the process for customizing the calendar display format;

FIG. 8 is a screen shot of the user report data interface for creating customized shipment reports based on parameters selected by the user;

FIG. 9 is a flow diagram illustrating steps of the process for creating the customized shipment report;

FIGS. 10 and 11 are flow diagrams illustrating further steps of the process for creating the customized shipment report;

FIG. 12 is a flow diagram illustrating the process for adding a user event to the shipment planner;

FIG. 13 is a screen shot of the user events interface;

FIG. 14 is a flow diagram illustrating the "onclick" process for displaying shipment and event information from the calendar interface;

FIG. 15 is a screen shot of a pop-up window providing shipment tracing information;

FIG. 16 is a pop-up window displayed when "mousing over" a shipment reference code;

FIG. 17 is a pop-up window displayed when "mousing over" a user events reference code;

FIG. 18 is a flow diagram demonstrating the process for changing the display of the calendar interface; and FIG. 19 is a screen shot of the planner options interface.

DESCRIPTION OF THE PREFERRED EMBODIMENT AND BEST MODE

Referring now specifically to the drawings, an electronic shipment planner according to the present invention is illustrated in the flow diagram of FIG. 1 and referenced generally at 10. The shipment planner 10 is applicable for presenting shipment and scheduling information and personal events information to a user in a convenient, easy to read, interactive calendar display format. As indicated in FIG. 2, users access the shipment planner 10 from a client interface 11 via an Internet service provider 12 and suitable communications equipment 14, such as a modem. The client interface 11 may be any application, such as a PC Web browser, which understands computer markup language, such as HTML and Dynamic-HTML. The shipment planner 10 is made available to the client interface 11 from a system Web server 15 via Internet service provider 16 and standard communications equipment 17. Data is supplied to the shipment planner on or off site through the Internet. According to one embodiment, users access the shipment planner 10 from a workstation including a computer, keyboard, mouse, monitor, and modem connection. The shipment planner 10 provides ready and convenient access to shipment delivery and tracking information from any location in the world, on any day of the week, and at any time of day.

Referring now to the flow diagram of FIG. 1, the shipment planner 10 includes four data repositories 21, 22, 23, and 24, respectively: (1) "display options data"—contains display parameters used to customize how the shipment planner is displayed to the user; (2) "user reports data"—contains report profiles which query the shipment data to create customized user reports; (3) "shipment data"—contains all shipment and scheduling information; (4) "user events data"—contains personal events information.

Display Options

Upon accessing the shipment planner 10 via the client interface 11, preprogramed default display parameters are retrieved from the display options data repository 21. The display parameters define a calendar interface 30, shown in FIGS. 3-6, in the form of a convenient, easy-to-read calendar. After the initial display, the user can readily modify the format of the calendar interface 30 by selecting various customization options indicated in the flow diagram of FIG. 7. Referring to FIG. 7, from the default screen shown in FIG. 3, the user chooses to view the calendar interface 30 in a desired screen format 32 including either a "normal" format which displays a page header and footer, or a "full screen" format which omits the page header and footer. In the full screen format, the user can further elect to set the display width based on the screen width or on a preprogramed default parameter. The user then chooses to view the accessed shipment data and personal events information in either a month, day, or week display format, 33, 34, and 35, respectively. The default setting shown in FIG. 3 illustrates a month display format 33. FIG. 4 illustrates a day display format 34. The week display 35, shown in FIGS. 5 and 6, can be viewed in either a horizontal or a vertical format, 36 and 37, respectively.

User Report Data

Referring to FIGS. 8-11, customized profiles are created using a report data interface 40. The user reports are titled by the user for subsequent retrieval, and are stored in the user reports data repository 22. The user may choose to create a report based on numerous options, including: the shipment delivery status 41 (delivered, undelivered, delayed, delivered with an exception); the payment status 42 (paid, unpaid, overdue); the paying party 43 (collect or prepaid); date restrictions 44 (pickup, due, appointment, delivery); past or future date time frame 45 and 46 (yesterday, tomorrow, last week, next week, last # of days, next # of days, week-to-date, month-to-date, date range); inbound options 47 (origin state, origin zip code, shipper location, shipper state, shipper zip code, shipper serving station); outbound options 48 (destination state, destination zip code, consignee location, consignee state, consignee zip code, consignee serving station); and third party options 49 (paying location, origin state, origin zip code, origin station, destination state, destination zip code, destination station).

As shown in FIG. 9, to create a customized report, the user first selects the shipment status 41 for desired shipments to be retrieved in the report. The user chooses between delivered shipments, delayed shipments, undelivered shipments, shipments delivered with exception, or shipments of any status. After this selection, the user then chooses the shipment payment status 42 for shipments which are either paid, unpaid, overdue, or of any payment status. The user then selects the paying party 43 choosing between shipments which are either prepaid by the paying party, or those which require collection from the paying party.

Shipment date restrictions 44 are selected, as indicated in FIG. 10. The user first selects the shipment date type—either the pickup date, the delivery date, the due date, or the appointment date. For pickup and delivery date shipments, the user further selects a past date limit 45 including yesterday, last week, a selected past number of days, last week-to-date, last month-to-date, or a specified date range. For due date and appointment date shipments, the user further selects a future date limit 46 including tomorrow, next week, a selected number of days in the future, or a specified future date range.

Referring to FIG. 11, after selecting the shipment date restrictions 44, the user selects inbound, outbound, and third party options, 47, 48, and 49. The user starts with freight type options. For the inbound freight option selections 47, the user chooses between select inbound freight, all inbound freight, and no inbound freight. Select inbound freight includes one or more of the origin states, origin zip codes, destination locations, destination states, destination zip codes, and destination serving station. Next, the user makes outbound freight options selections 48. For select outbound freight, the user chooses one or more of the destination states, destination zip codes, origin locations, origin states, origin zip codes, and origin serving station. Finally, the user makes third party freight option selections 49. For select inbound freight, the user chooses one or more of the paying locations, origin states, origin zip codes, origin locations, destination states, destination zip codes, destination locations.

Shipment Data

Shipment data is entered into the electronic shipment data repository 23 which can be updated at any time by authorized field and general office personnel via electronic data interchange (EDI) or the Internet. Preferably, shipment data is entered into the repository at the time a service center receives a shipper's bill of lading. The customized user reports, described above, operate to electronically filter the shipment data contained in the shipment data repository to provide only the selected information requested by the user.

Personal Events

Referring now to the flow diagram of FIG. 12, mouse-clicking on the "Add Event" icon 50 displayed in the calendar interface 30 allows the user to add new personal events to the shipment planner 10. From a user events interface 50, shown in FIG. 13, the user inputs the title of the event, a description of the event, the day of the event, the starting time, and the ending time. Once this input is completed, the user then elects to clear, delete, save and apply, or cancel the event. Mouse-clicking on the "Clear" icon 51 clears the event data from display and returns the user to the events interface. Mouse-clicking on the "Delete" icon 52 triggers a confirmation query 53 asking the user to confirm the deletion. When confirmed, the event data is deleted and the user is returned to the calendar interface 30. Mouse-clicking on the "Save & Apply" icon 54 saves the inputted event data in the user events data repository 24, and transfers the user back to the calendar interface 30. Mouse-clicking on the "Cancel" icon 55 transfers the user directly to the calendar interface 30 without saving the new events data. Previously entered events data is stored in the user events data repository 24.

Using the Shipment Planner 10

The user navigates the shipment planner 10 from his workstation using the attached mouse and a convenient point-and-click, menu-driven software. Upon accessing the shipment planner 10, the selected customized user report electronically filters the information contained in the shipment data repository 23, as described above, to display only the desired shipment data in the calendar interface 30. From the calendar interface 30, the user can choose to view shipment and scheduling information or personal events data by mouse-clicking directly on a shipment data link 61 or a personal events link 62 appearing on the screen (See FIGS. 3-6). The links 61 and 62 are displayed in the calendar interface 30 on certain days of the month corresponding to their respective event dates. In one embodiment, the shipment data link 61 is a shipment reference code, such as an internal system reference number, a bill of lading number, or a purchase order number, which is associated with certain shipment data and scheduling information contained in the shipment data repository 23. When a shipment reference code is selected, the client interface 11 accesses the associated shipment and scheduling information and downloads this information for display to the user. The personal events data link 62 is preferably a one or two word event title. When an event title is selected, the client interface 11 accesses the associated personal events information contained in the user events data repository 24 and downloads this information for display to the user.

For convenient viewing, the shipment reference codes and event titles are preferably color-coded, as indicated in the legend 63, to readily distinguish between inbound shipments, outbound shipments, third party shipments, and personal events. For example, inbound shipments may be designated by the color blue, outbound shipments designated by red, third party shipments designated by green, and personal events designed by orange.

Referring to FIGS. 14 and 15, using an "onclick process" 70 the user mouse-clicks directly on either a shipment data link 61 or personal events data link 62 in the calendar interface 30, as previously described. Upon selecting a shipment data link 61, the client interface 11 downloads the associated shipment data from the shipment data repository 23 and a pop-up trace window 80, shown in FIG. 15, is displayed to the user. The trace window 80 provides detailed information regarding the selected shipment, including its present location, shipment origin, destination, bill of lading number, purchase order number, number of pieces, shipment weight, and the e-mail addresses of the origin and destination service centers. If a personal events data link 62 is selected, the client interface 11 downloads the associated event data from the user events data repository 24. The selected event information is then displayed, as shown in FIG. 13. This information indicates the event title, a description of the event, the day of the event, the event starting time, and the event ending time.

Referring again to FIGS. 1 and 3, from the calendar interface 30, the user can further elect to view shipment data and events information for preceding and succeeding calendar units by mouse-clicking on the "Previous" and "Next" icons, 81 and 82, respectively. The "Refresh" icon 83 reloads the calendar interface. By "mousing-over" 84 (without clicking) shipment reference code and event titles displayed in the calendar interface 30, respective pop-up windows 85 and 86 provide a brief summary of the shipment status, as shown in FIG. 16, and the personal event, as shown in FIG. 17. The shipment summary includes an internal system reference number, a purchase order number, a concise status statement, and the name of the person signing the delivery. The event summary includes the title of the event, a brief description, and the duration of the event.

Changing the Calendar Interface 30

Referring to FIGS. 18 and 19, from the calendar interface 30, the user can select the "Options" icon 90 to change the default shipment reference codes which appear on the calendar interface 30 upon accessing the shipment planner 10, and the actual dates upon which the shipment reference codes are posted. In order to change the default settings, the client interface 11 accesses both the display options data repository 21 to display the current options selected, and the user reports data repository 22 to display the available shipment reports.

A planner options interface 100, shown in FIG. 19, allows the user to customize the appearance of the calendar interface 30 by first selecting which shipment report to access. Preferably, a drop-down window displays all previously entered reports stored in the user reports data repository for convenient selection by the user. After selecting the desired report, the user then chooses whether to display one or more of inbound, outbound, or third party shipments contained in the report, and whether the shipments will be displayed to the calendar interface on either the due or delivery date, or the shipment date. The shipment reference code to be displayed is then selected from either a purchase order number, a bill of lading number, or an internal system reference number. The user then selects a default display by month, day, or week with a further option to display the calendar interface without header and footer, or to expand the calendar interface to screen size based on the user's monitor. Finally, the user elects to started the display with either the current date or the date of the first active shipment. For the week display, the user can further elect a horizontal format (See FIG. 5) or a vertical format (See FIG. 6). Once the report data selections are completed, the user can either save the selections and return to the calender interface, or cancel the selections.

An electronic shipment planner is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. An electronic shipment planner adapted for electronically presenting shipment and scheduling information to a user, said shipment planner comprising:
   (a) a shipment data repository containing shipment and scheduling information for inbound freight and outbound freight;
   (b) a system interface communicating with said shipment data repository;
   (c) a calendar display interface for displaying said shipment planner to the user in a calendar format, said calendar format comprising a tabular register of days;
   (d) a plurality of interactive shipment data links displayed in said calendar display interface, and electronically associated with the shipment and scheduling information, said plurality of shipment data links cooperating with said system interface as commanded by the user to access and retrieve the associated shipment and scheduling information contained in said shipment data repository, and said plurality of shipment data links comprising:
      (i) a plurality of inbound freight data links for accessing and retrieving associated inbound freight information from said shipment data repository;
      (ii) a plurality of outbound freight data links for accessing and retrieving associated outbound freight information from said shipment data repository; and
      (iii) said calendar display interface further comprising a plurality of data codes visually distinguishing said inbound and outbound freight data links.

2. An electronic shipment planner according to claim 1, and comprising shipment data input means communicating with said shipment data repository for loading shipment and scheduling information into said shipment data repository.

3. An electronic shipment planner according to claim 1, wherein said system interface comprises a Web browser.

4. An electronic shipment planner according to claim 1, wherein at least one of said shipment data links comprises a predetermined portion of the shipment and scheduling information.

5. An electronic shipment planner according to claim 1, wherein at least one of said shipment data links comprises a shipment reference code.

6. An electronic shipment planner according to claim 5, wherein said shipment reference code is selected from the group consisting of a bill of lading number and a purchase order number.

7. An electronic shipment planner according to claim 1, wherein said plurality of data codes comprise color-coding to readily distinguish inbound and outbound shipments.

8. An electronic shipment planner according to claim 7, and comprising a legend for indicating the color-code for each inbound shipment and outbound shipment.

9. An electronic shipment planner according to claim 1, and comprising a display options data repository containing format parameters for customizing the format of said calendar display interface.

10. An electronic shipment planner according to claim 9, and comprising a display options data interface communicating with said display options data repository for setting desired format parameters contained in said display options data repository.

11. An electronic shipment planner according to claim 1, and comprising an input device for selecting said interactive shipment data link from said calendar display interface.

12. An electronic shipment planner according to claim 11, wherein said input device comprises a computer mouse.

13. An electronic shipment planner according to claim 1, and comprising a report data repository containing profile parameters for displaying the shipment and scheduling information in a customized user report.

14. An electronic shipment planner according to claim 13, and comprising a report data interface communicating with said report data repository for setting desired profile parameters contained in said report data repository.

15. An electronic shipment planner according to claim 1, and comprising a personal event data repository containing personal event information of the user, the personal event information being associated with a personal event date.

16. An electronic shipment planner according to claim 15, and comprising a personal event data interface communicating with said personal event data repository for loading personal event information into said personal event data repository.

17. An electronic shipment planner according to claim 16, and comprising an interactive personal event data link electronically associated with the personal event information, and cooperating with said system interface as commanded by the user to access and retrieve the associated personal event information contained in said personal event data repository.

18. An electronic shipment planner according to claim 17, wherein said personal event data link comprises a predetermined portion of the personal event information.

19. An electronic shipment planner according to claim 17, wherein said personal event data link comprises a title of the personal event information.

20. An electronic shipment planner adapted for electronically presenting shipment and scheduling information to a user, the shipment and scheduling information including at least one event date, said shipment planner comprising:
   (a) a shipment data repository containing shipment and scheduling information for inbound freight and outbound freight;
   (b) a system interface communicating with said shipment data repository;
   (c) a calendar display interface for displaying said shipment planner to the user in a calendar format, said calendar format comprising a tabular register of days;
   (d) a plurality of interactive shipment data links contained within certain days displayed in said calendar display interface, and electronically associated with the shipment and scheduling information, said plurality of shipment data links cooperating with said system interface as commanded by the user to access and retrieve the associated shipment and scheduling information contained in said shipment data repository, and said plurality of shipment data links comprising:

(i) a plurality of inbound freight data links for accessing and retrieving associated inbound freight information from said shipment data repository; and (ii) a plurality of outbound freight data links for accessing and retrieving associated outbound freight information from said shipment data repository;

(e) a personal event data repository containing personal event information of the user, the personal event information being associated with a personal event date;

(f) a plurality of interactive personal event data links contained within certain days displayed in said calendar display interface, and electronically associated with the personal event information of the user, said plurality of personal event data links cooperating with said system interface as commanded by the user to access and retrieve the associated personal event information contained in said personal event data repository;

(g) said calendar display interface further comprising a first data code visually distinguishing all of said inbound freight data links contained within said tabular register of days, a second data code visually distinguishing all of said outbound freight data links contained within said tabular register of days, a third data code visually distinguishing all of said personal event data links contained within said tabular register of days; whereby said shipment planner defines an interactive visual reference adapted for managing and tracking shipments; and (h) a legend for indicating the data code for each of said shipment data and personal event data links.

* * * * *